US009963360B2

(12) United States Patent
Kratochvil et al.

(10) Patent No.: US 9,963,360 B2
(45) Date of Patent: May 8, 2018

(54) REMOVAL OF DISSOLVED SELENIUM FROM AQUEOUS SOLUTIONS

(71) Applicant: BIOTEQ ENVIRONMENTAL TECHNOLOGIES INC., Vancouver (CA)

(72) Inventors: David Kratochvil, Vancouver (CA); Farzad Mohammadi, Vancouver (CA); Patrick Littlejohn, Vancouver (CA); David Sanguinetti, Vancouver (CA)

(73) Assignee: BQE WATER INC., Vancouver (CA)

( * ) Notice: Subject to any disclaimer, the term of this patent is extended or adjusted under 35 U.S.C. 154(b) by 199 days.

(21) Appl. No.: 15/026,871

(22) PCT Filed: Oct. 3, 2014

(86) PCT No.: PCT/CA2014/050962
§ 371 (c)(1),
(2) Date: Apr. 1, 2016

(87) PCT Pub. No.: WO2015/048907
PCT Pub. Date: Apr. 9, 2015

(65) Prior Publication Data
US 2016/0289092 A1 Oct. 6, 2016

Related U.S. Application Data

(60) Provisional application No. 61/887,263, filed on Oct. 4, 2013, provisional application No. 61/888,908, filed on Oct. 9, 2013.

(51) Int. Cl.
*C02F 1/42* (2006.01)
*C02F 1/44* (2006.01)
(Continued)

(52) U.S. Cl.
CPC .................. *C02F 1/42* (2013.01); *B01J 41/05* (2017.01); *B01J 49/57* (2017.01); *C02F 1/442* (2013.01);
(Continued)

(58) Field of Classification Search
None
See application file for complete search history.

(56) References Cited

U.S. PATENT DOCUMENTS 4,806,264 A 2/1989 Murphy
4,915,928 A 4/1990 Marcantonio
(Continued)

FOREIGN PATENT DOCUMENTS

WO WO-2007/146658 A2 12/2007
WO WO-2012/040525 A1 3/2012

OTHER PUBLICATIONS

International Search Report and Written Opinion for International Application No. PCT/CA2014/050962 dated Jan. 8, 2015.
(Continued)

*Primary Examiner* — Chester T Barry
(74) *Attorney, Agent, or Firm* — Mintz Levin Cohn Ferris Glovsky and Popeo PC

(57) ABSTRACT

Processes for treating aqueous solutions to remove dissolved selenium species, for example in the presence of an excess of sulphate anions, which include the use of strongly basic anion exchange resins, or co-precipitation and adsorption of the selenate (and selenite) with mixed ferrous and ferric iron, or combinations thereof. Co-precipitation and adsorption of selenate may take place in an electrolytic cell in the presence of ferrous and/or ferric iron.

39 Claims, 14 Drawing Sheets

(51) Int. Cl.
*C02F 1/52* (2006.01)
*C02F 1/467* (2006.01)
*B01J 41/05* (2017.01)
*B01J 49/57* (2017.01)
C02F 1/04 (2006.01)
C02F 1/463 (2006.01)
C02F 1/66 (2006.01)
C02F 101/10 (2006.01)
C02F 103/18 (2006.01)

(52) U.S. Cl.
CPC .......... *C02F 1/4678* (2013.01); *C02F 1/5245* (2013.01); *C02F 1/04* (2013.01); *C02F 1/441* (2013.01); *C02F 1/463* (2013.01); *C02F 1/66* (2013.01); *C02F 2001/422* (2013.01); *C02F 2001/5218* (2013.01); *C02F 2101/106* (2013.01); *C02F 2103/18* (2013.01); *C02F 2303/16* (2013.01)

(56) References Cited

U.S. PATENT DOCUMENTS

| | | | |
|---|---|---|---|
| 5,264,133 | A | 11/1993 | Forschner et al. |
| 5,322,600 | A | 6/1994 | Spitz et al. |
| 5,441,689 | A * | 8/1995 | Laity .................. D01F 2/00 210/670 |
| 5,494,582 | A | 2/1996 | Goodman |
| 5,601,721 | A | 2/1997 | Lukasiewicz et al. |
| 5,993,667 | A | 11/1999 | Overman |
| 6,156,191 | A | 12/2000 | Overman |
| 6,235,204 | B1 | 5/2001 | Castaldi et al. |
| 8,080,163 | B2 | 12/2011 | Moller et al. |
| 8,282,835 | B2 | 10/2012 | Schwarz et al. |
| 2012/0241381 | A1 | 9/2012 | Bruso |

OTHER PUBLICATIONS

Baek et al., "Iron anode mediated transformation of selenate in sand columns," Water Research, vol. 47, Issue 17, (2013), pp. 6538-6545.

Baek et al., "Electrochemical removal of selenate from aqueous solutions," Chemical Engineering Journal, 215-216, pp. 678-684.

BioteQ to deal with selenium in Elk Valley waters, The Free Press, posted May 30, 2013 at 3:00pm, http://www.thefreepress.ca/news/209581551.htlm (3 pages).

Cheaper selenium removal, Water Management, www.miningmagazine.com, (2014), http://www.bioteq.ca/wp-content/uploads/2014/11/201410-Cheaper-selenium-removal-MM.pdf (2 pages).

CH2MHILL, Sandy et al., "Review of Available Technologies for the Removal of Selenium from Water," North American Metals Council (NAMC), (2010), 223 pgs.

CH2MHILL, NAMC White Paper Report Addendum, Technical Addendum, (2013), 68 pgs.

Myneni et al., "Abiotic Selenium Redox Transformations in the Presence of Fe(II,III) Oxides," Science, vol. 278, (1997) pp. 1106-1109.

* cited by examiner ns, the present invention facilitates the removal of dissolved selenium species, such as selenate, Se(VI), anions from aqueous solutions. In some embodiments, selenium concentrations may for example be reduced
REMOVAL OF DISSOLVED SELENIUM FROM AQUEOUS SOLUTIONS

FIELD OF THE INVENTION

The invention is in the field of water treatment for removing ionic selenium species, involving ion exchange resins, electrolysis, nanofiltration, and precipitation of selenium solids.

BACKGROUND OF THE INVENTION

Selenium (Se) exists in four major oxidation states, +6, +4, 0, −2 (Se(VI), Se(IV), Se(0) and Se(−II)). Its environmental speciation can be complex and dependent on various factors including availability of oxygen, the presence of other oxidizing or reducing species and pH, with a variety of both inorganic and organic species occurring within its biogeochemical cycle. Selenium is found in industrial waters in all four oxidation states, with the main species being selenate Se(VI) and selenite Se(IV). Reducing the levels of dissolved selenium in industrial wastewaters is becoming an increasing environmental concern, with new environmental regulations requiring that selenium levels in industrial discharges be reduced to ppb concentrations.

A variety of systems are known for biological selenium removal from water, typically using bacteria capable of reducing selenates and selenites to insoluble elemental selenium (see for example International Patent Application WO 2007/146658). These processes may require heat to be added to facilitate the biological process. Alternative processes that have been applied to Se(VI) removal include membrane separation (see for example International Patent Application WO 2012/040525), and reverse osmosis or nanofiltration combined with evaporation and crystallization.

Other options for removal of selenium from water involve the use of iron. Iron (Fe) also exists in a number of oxidation states, −2 to +6, with +2 (ferrous (Fe(II)) and +3 (ferric Fe(III)) being the most common Like selenium speciation, iron speciation is affected by the presence/absence of oxygen and other oxidizing or reducing species, and pH, amongst other factors. Biotic or abiotic redox reactions in the environment can form green rusts, which are metastable precipitates of mixed ferrous and ferric hydroxides with interlayers of sulphate or other anions.

Selenite Se(IV) removal from wastewater has been demonstrated through precipitation with ferric solids (typically oxy-hydroxides). Existing selenate Se(VI) removal techniques however are dependent on reduction of Se(VI) to Se(IV) or elemental Se(0) prior to removal from solution and, as such, are associated with long retention times (in the order of hours), high cost and large volumes of waste by-product. Co-precipitation of selenate Se(VI) with green rust under anoxic laboratory conditions has been reported as an initial step in the first-order kinetic reduction of Se(VI) to Se(IV) by green rust, with the rate constant for the reduction step being in the range 1.03-1.68 ($\times 10^{-2}$ hour$^{-1}$) (Myneni et al., 1997, *Science*, 278:1106-1109).

Selenium-laden industrial waters typically also contain sulphate, chloride, bicarbonate and nitrate in concentrations that are often orders of magnitude greater than that of selenium, which can further complicate the removal of the selenium. Often, it may not be necessary to remove these additional constituents, so selective removal of selenium species in the context of relatively high concentrations of chemically similar anionic species may be advantageous in these cases.

U.S. Pat. No. 6,235,204, describes a process applicable primarily to Flue Gas Desulphurization (FGD) scrubber blow-down water, which is an improvement to the process described in an earlier patent (U.S. Pat. No. 4,806,264). Both processes rely on chemical reduction of selenium oxyanions using ferrous iron followed by precipitation of reduced selenium species (selenite/elemental selenium) with the generated iron sludge. The processes are subject to retardation of selenium chemical reduction (and thus removal) when inhibiting constituents such as oxygen gas, nitrate, bicarbonate, calcium and magnesium are present in solution. The process described in U.S. Pat. No. 6,235,204 also requires that reaction tanks are sparged with an inert gas (preferably nitrogen) in order to eliminate oxygen, which inhibits selenium reduction reactions. The minimum retention time required for selenium reduction/co-precipitation by the processes described in U.S. Pat. Nos. 6,235,204 and 4,806,264 is 20 and 120 minutes, respectively. Ferrous required for selenium reduction is provided from a ferrous salt (preferably ferrous chloride). A temperature in the range of 25-50° C. is required, with 35° C. being preferred.

U.S. Pat. No. 8,080,163 describes a process for treating wastewater to remove dissolved contaminants, which may include selenate, by a series of steps including primary and secondary treatments to remove solids, addition of metal salt reagents followed by a tertiary treatment that may include ion exchange, and recycling of metal salt residuals from the tertiary treatment to an earlier point in the process. The availability of the metal for generating metal salt residuals may be improved by chemically reacting the metal or solution by various means, including precipitation or co-precipitation.

U.S. patent application Publication No. 2012/0241381 describes a two stage process for reducing the concentration of selenium in wastewater that includes a first stage comprising bulk removal of selenite from the wastewater by precipitation with ferric chloride, followed by a second stage treatment that includes a hydride generation process or ion exchange.

U.S. Pat. No. 5,322,600 describes a process for removing dissolved selenium from wastewater by passing the wastewater sequentially through an anode chamber, a sub-micron filter, a cathode chamber and another sub-micron filter. Elevated temperatures of 90-120° F. are required.

Baek et al. (2013, *Chemical Engineering Journal*, 215-216:678-684) describe removal of selenate from solution in a batch electrochemical system using a reactive iron anode and copper plate cathode in a bicarbonate medium. The anode generates ferrous hydroxide, which reduces the selenate to selenite followed by precipitation with ferric iron. Attempts to remove selenate from the solution with ferrous hydroxide without the application of a current in this system were only minimally successful, and required long retention times (6 hours).

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

In various aspects, the present invention facilitates the removal of dissolved selenium species, such as selenate, Se(VI), anions from aqueous solutions. In some embodiments, selenium concentrations may for example be reduced to below 5 ppb, for example, to as low as 1 ppb or below. Aspects of the invention facilitate selectivity for selenium oxyanions in the presence of other anionic species, thereby helping to minimize the amount of waste byproduct that would require further treatment or disposal. In various aspects, the invention generates a solid product from which elemental selenium may be recovered. In selected embodiments, exemplary methods of the invention may be used for treating relatively high flows of relatively cold water.

In accordance with one aspect, the invention relates to a process for treating an aqueous solution to remove dissolved selenium oxyanions comprising:

(A) an ion exchange process comprising:

passing a primary aqueous solution comprising selenate and at least a second anion over a strongly basic anion exchange resin loaded with the second anion, under loading conditions whereby the selenate anions displace the second anion from the resin to produce a selenate loaded resin and an ion exchange discharge solution comprising a lower concentration of selenate than the primary aqueous solution, wherein the second anion is present in the primary aqueous solution in excess of the selenate;

treating the selenate loaded resin with a regenerant solution comprising selenate and the second anion under regenerating conditions whereby the second anion in the regenerant solution displaces selenate anions from the selenate loaded resin to produce a selenate laden regenerant solution having a higher concentration of selenate than the primary aqueous solution, wherein the regenerant solution comprises a higher concentration of the second anion than the primary aqueous solution;

removing selenate from the selenate laden regenerant solution to produce a selenium depleted regenerant solution, and recycling the selenium depleted regenerant solution to form to the regenerant solution for treating the selenate loaded resin; or (B) a selenate precipitation process comprising:

passing a selenate-containing aqueous solution into a flow-through chamber;

contacting the selenate-containing aqueous solution in the flow-through chamber with one or more iron-bearing streams comprising ferrous iron or a ferrous/ferric iron mixture under conditions effective to co-precipitate or adsorb at least a portion of the selenate with the iron thereby producing a selenium-iron precipitate and a selenium depleted discharge solution, the conditions comprising a retention time in the flow-through chamber of between about 5 minutes and about 90 minutes and a pH between about pH7.0 and pH13.0, wherein the one or more iron-bearing streams comprises a total iron content of 100 mg/L or greater; and separating the selenium-iron precipitate from the selenium depleted discharge solution; or (C) the ion exchange process of (A) and the selenate precipitation process of (B), whereby the step of removing selenate from the selenate laden regenerant solution in the ion exchange process of (A) comprises the selenate precipitation process of (B), the selenate laden regenerant of the ion exchange process of (A) forms the selenate-containing aqueous solution of the selenate precipitation process of (B), and the selenium depleted discharge solution of the selenate precipitation process of (B) forms the regenerant solution of the ion exchange process of (A).

In another aspect, the invention relates to a process for treating an aqueous solution to remove dissolved selenium oxyanions comprising:

passing a primary aqueous solution comprising selenate and at least a second anion over a strongly basic anion exchange resin loaded with the second anion, under loading conditions whereby the selenate anions displace the second anion from the resin to produce a selenate loaded resin and an ion exchange discharge solution comprising a lower concentration of selenate than the primary aqueous solution, wherein the second anion is present in the primary aqueous solution in excess of the selenate;

treating the selenate loaded resin with a regenerant solution comprising selenate and the second anion under regenerating conditions whereby the second anion in the regenerant solution displaces selenate anions from the selenate loaded resin to produce a selenate laden regenerant solution having a higher concentration of selenate than the primary aqueous solution, wherein the regenerant solution comprises a higher concentration of the second anion than the primary aqueous solution;

passing the selenate laden regenerant solution into an electrolytic cell;

contacting the selenate laden regenerant solution in the electrolytic cell with one or more iron-bearing streams comprising ferrous iron or a ferrous/ferric iron mixture under conditions effective to co-precipitate or adsorb at least a portion of the selenate with the iron thereby producing a selenium-iron precipitate and a selenium depleted discharge solution, the conditions comprising a retention time in the flow-through chamber of between about 5 minutes and about 90 minutes and a pH between about pH7.0 and pH13.0, wherein the one or more iron-bearing streams comprises a total iron content of 100 mg/L or greater;

separating the selenium-iron precipitate from the selenium depleted discharge solution, and recycling the selenium depleted discharge solution to form to the regenerant solution for treating the selenate loaded resin.

In certain embodiments, the second anion is sulphate.

BRIEF DESCRIPTION OF THE DRAWINGS

These and other features of the invention will become more apparent in the following detailed description in which reference is made to the appended drawings.

Figure 7:
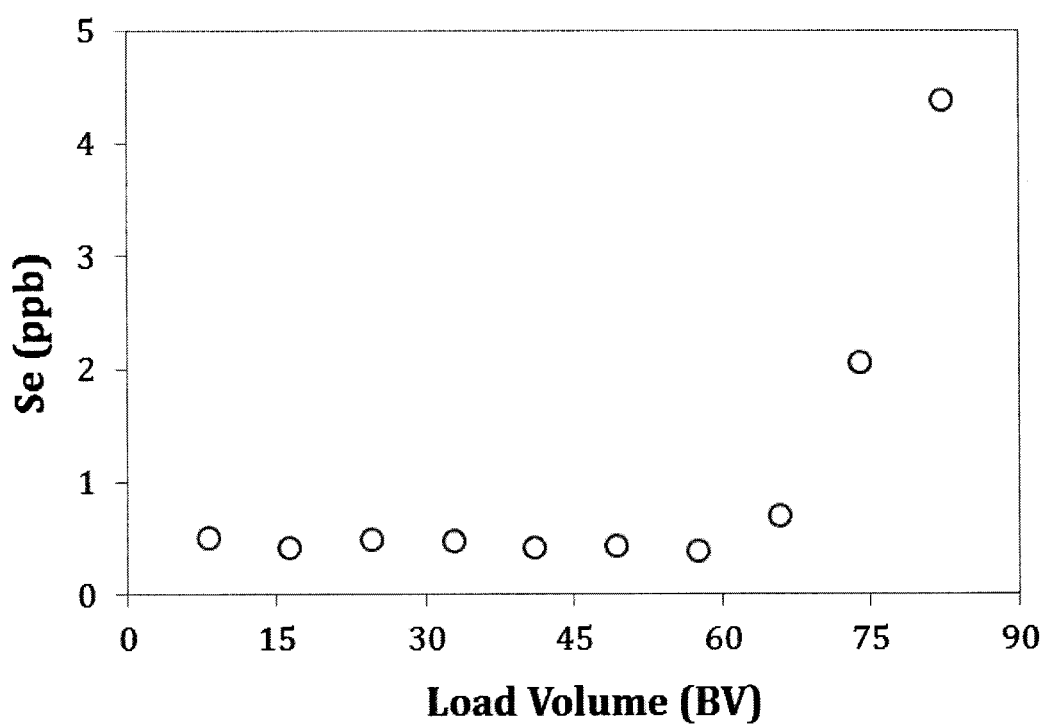
FIG. 7 is a graphic representation of an embodiment described in Example 1, showing Se concentration in spent load as a function of load volume. 1 BV=1 L, loading rate 16.5 BV/hr. The IX resin bed height is 6 ft, the IX column diameter is 1.5". Lanxess SBA resin M500.
Figure 9:
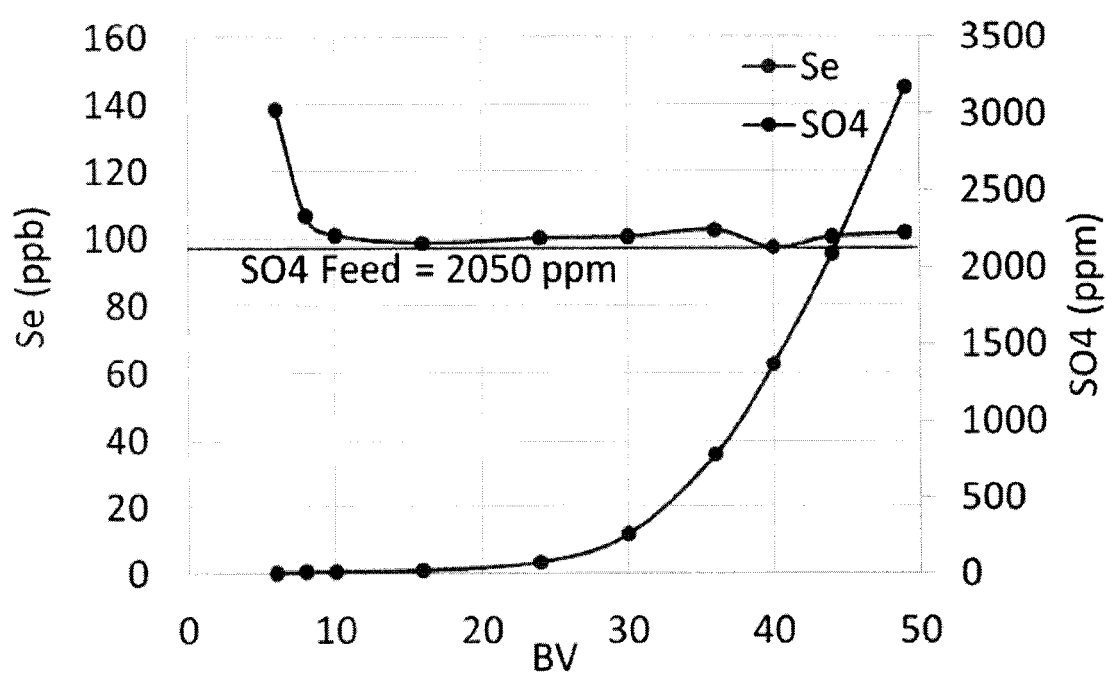

FIG. 9 is a graphic representation of an embodiment described in Example 2, showing Se concentration in spent load from pilot plant operation as a function of load volume. FIG. 7 also depicts the advantage of using the resin in sulphate form in that during the loading cycle sulphate does not compete with selenium (steady sulphate concentration). 1 BV=20 L, loading rate 6 BV/hr. The IX resin bed height is 4.5 ft, the IX column diameter is 4". Lanxess SBA resin M500.

Figure 10:
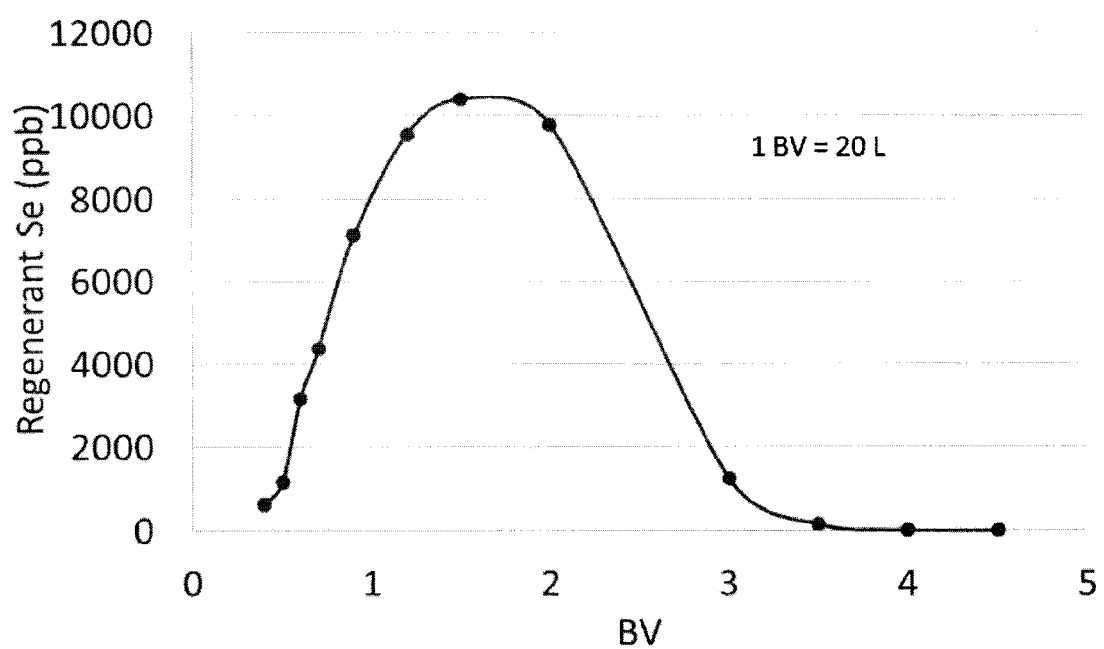

FIG. 10 is a graphic representation of an embodiment described in Example 2, showing Se concentration in spent regenerant from pilot plant operation as a function of regenerant volume. 1 BV=20 L, regeneration rate 1.5 BV/hr. The IX resin bed height is 4.5 ft, the IX column diameter is 4". Lanxess SBA resin M500.

Figure 11:
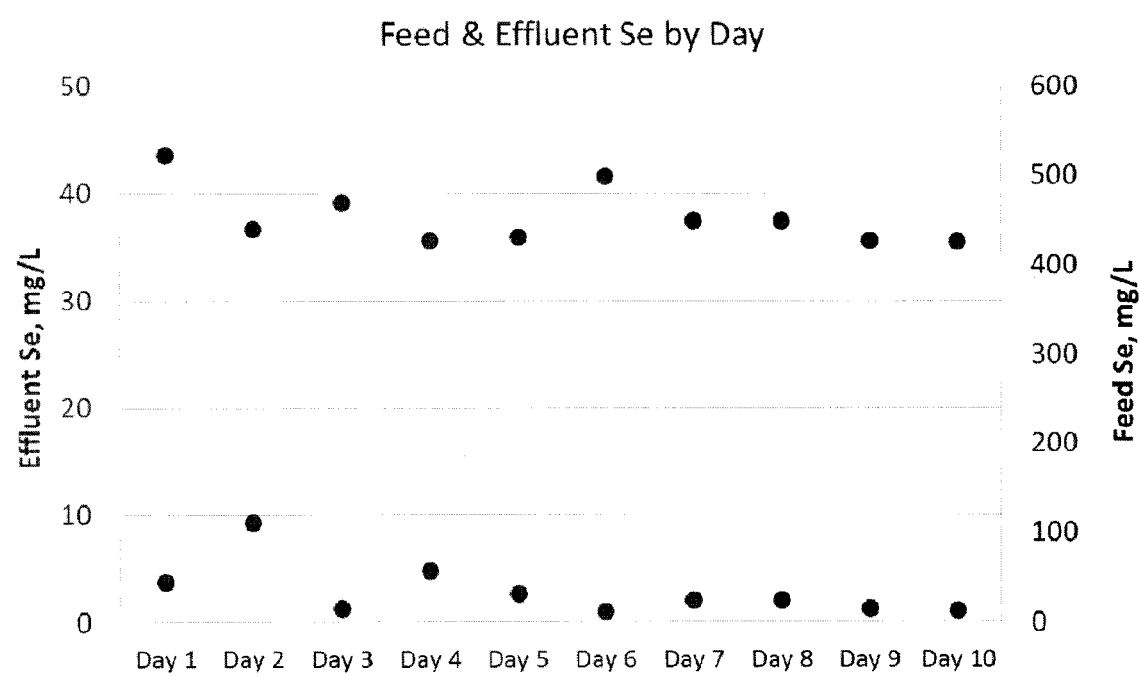

FIG. 11 is a graphic representation of an embodiment described in Example 2, showing Se concentration in spent load from pilot plant operation over 10 consecutive days of operation. 1 BV=20 L, loading rate 6 BV/hr. The IX resin bed height is 4.5 ft, the IX column diameter is 4". Lanxess SBA resin M500.

Figure 3:
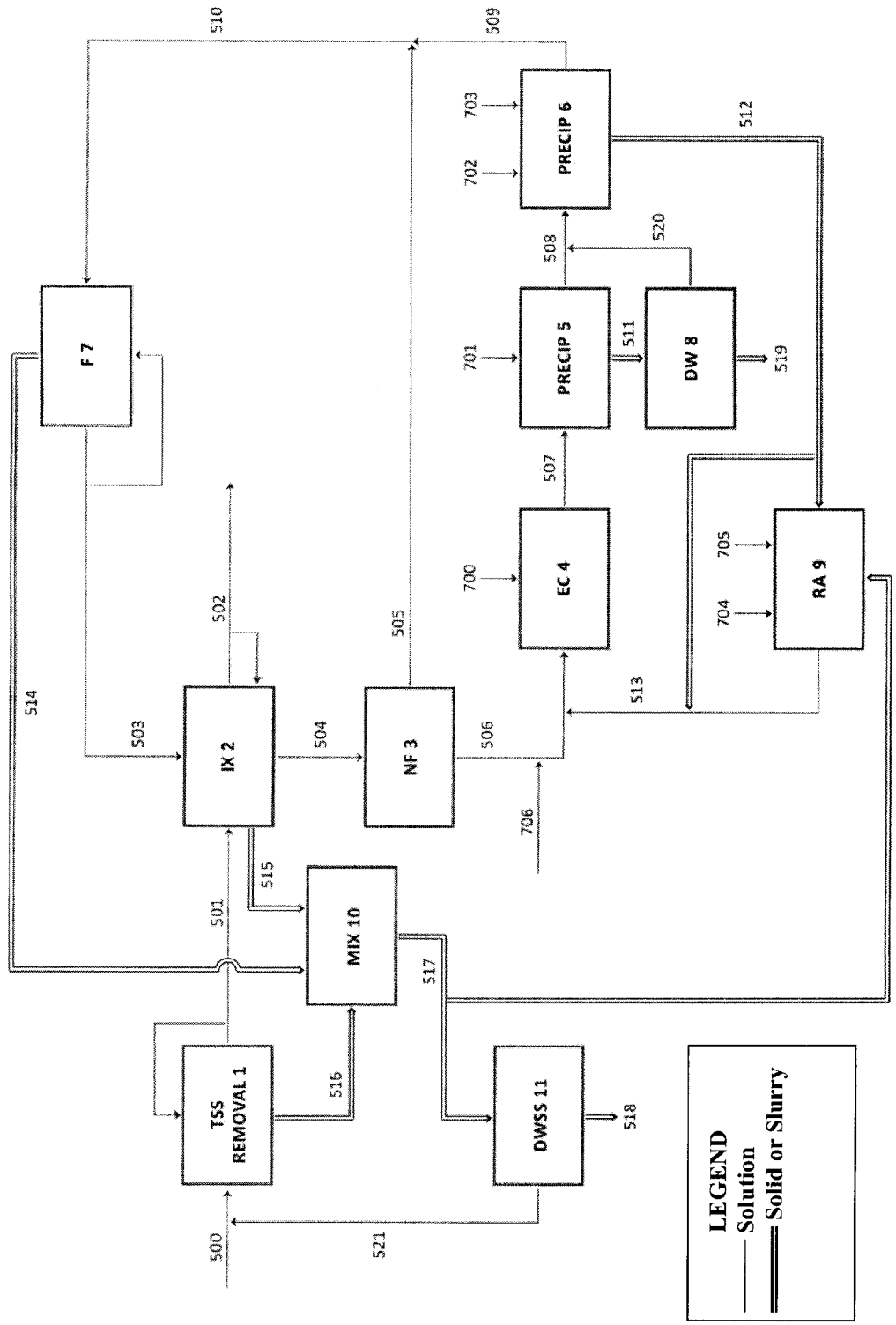
Figure 12:
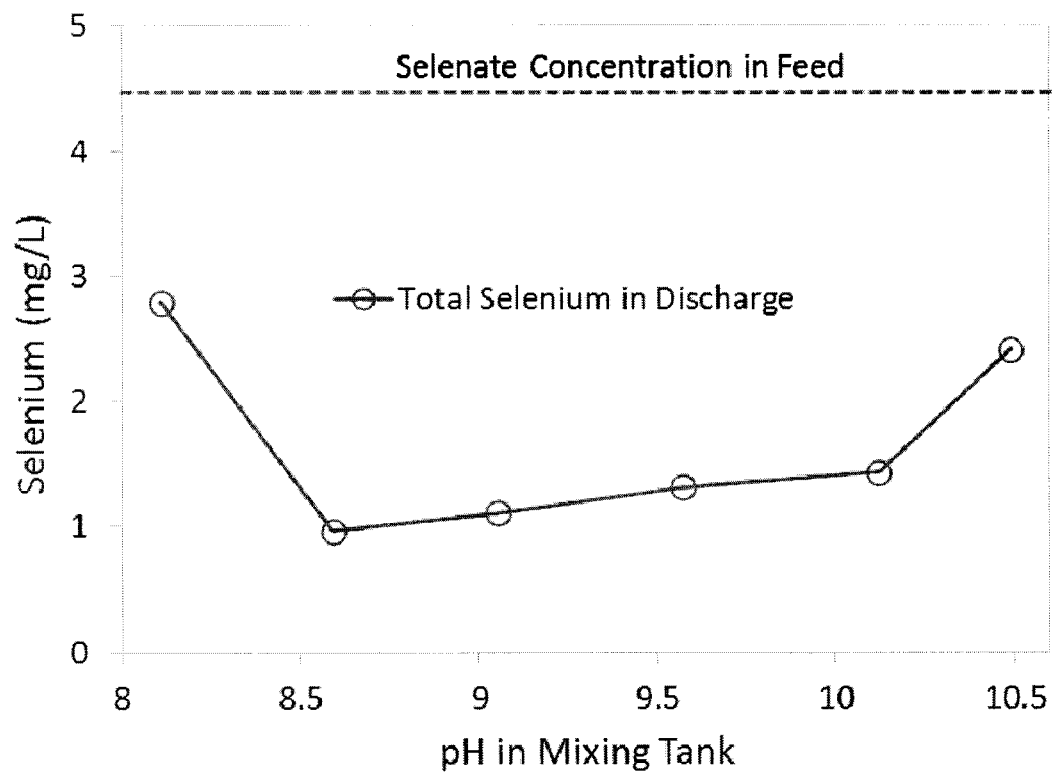

FIG. 12 is a graphic representation of an embodiment described in Example 3, showing the effect of pH on selenate removal in solution with >80 g/L total dissolved solids (TDS) including sulphate, nitrate, alkalinity and chloride using the process shown in FIG. 3. Test was done using hydraulic retention time (HRT)=10 minutes at room temperature and in a tank open to atmosphere with recycle of selenium laden solids. Total iron concentration in the cell was set to 10 g/L most of which was from recycle of selenium laden solids while there was 2 g/L ferrous addition from acidic ferrous sulphate source.

Figure 13:
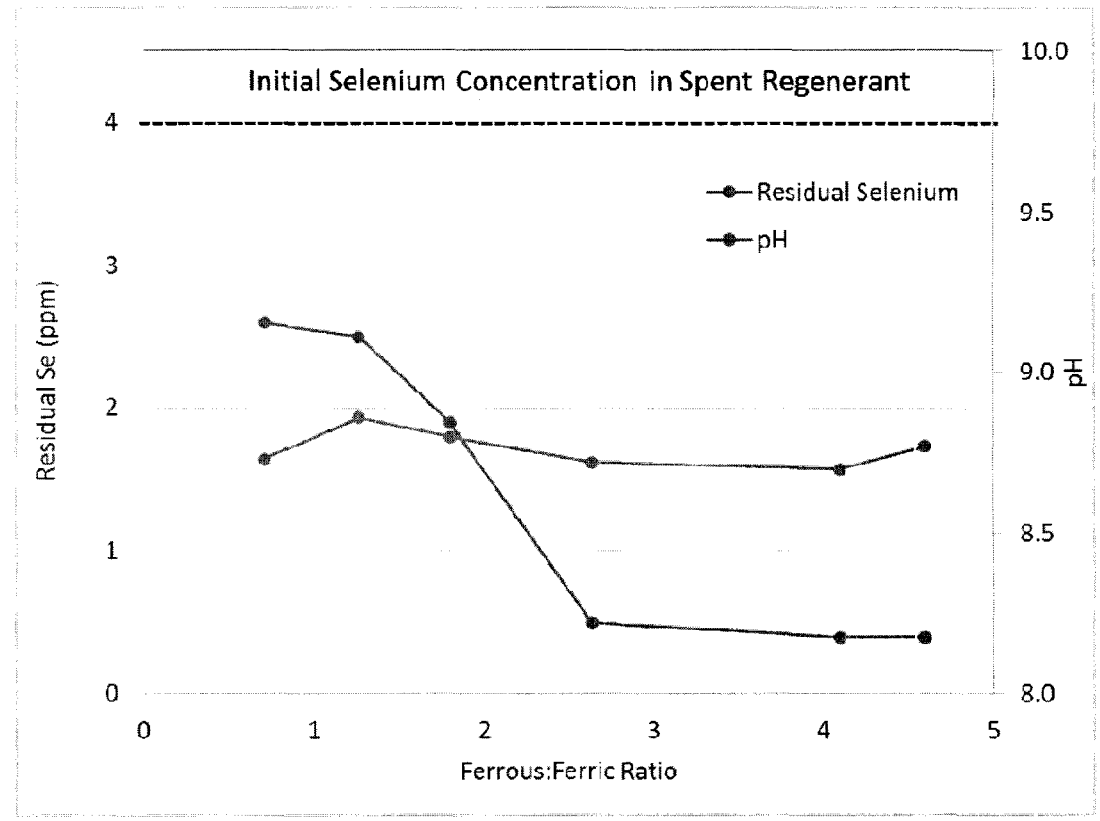

FIG. 13 is a graphic representation of an embodiment described in Example 4, showing the effect of ferrous:ferric ratio in the mixing tank on selenium removal in a continuous test with HRT=10 minutes. 2 g/L ferrous iron was added from acidic ferrous sulphate source while total iron concentration (including iron from recycle of solids) was set at 10 g/L. pH in mixing tank was ~8.7 and >80 g/L TDS was present. Initial Selenium concentration was 4 ppm.

Figure 6:
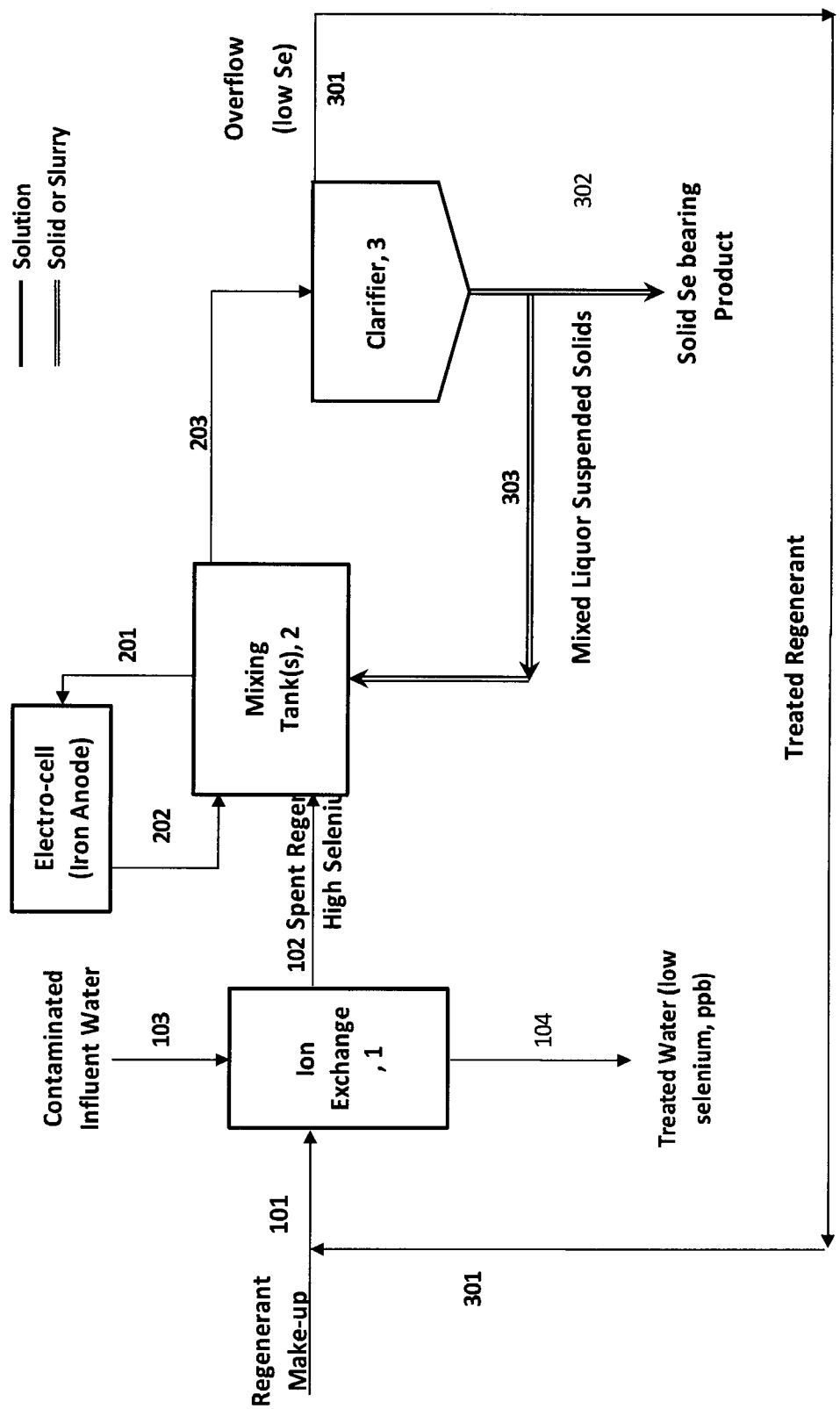
FIG. 6 shows one embodiment in which the process is integrated with ion exchange (IX) for treatment of the spent regenerant, which is more concentrated in selenium compared to the influent water.
Figure 14:
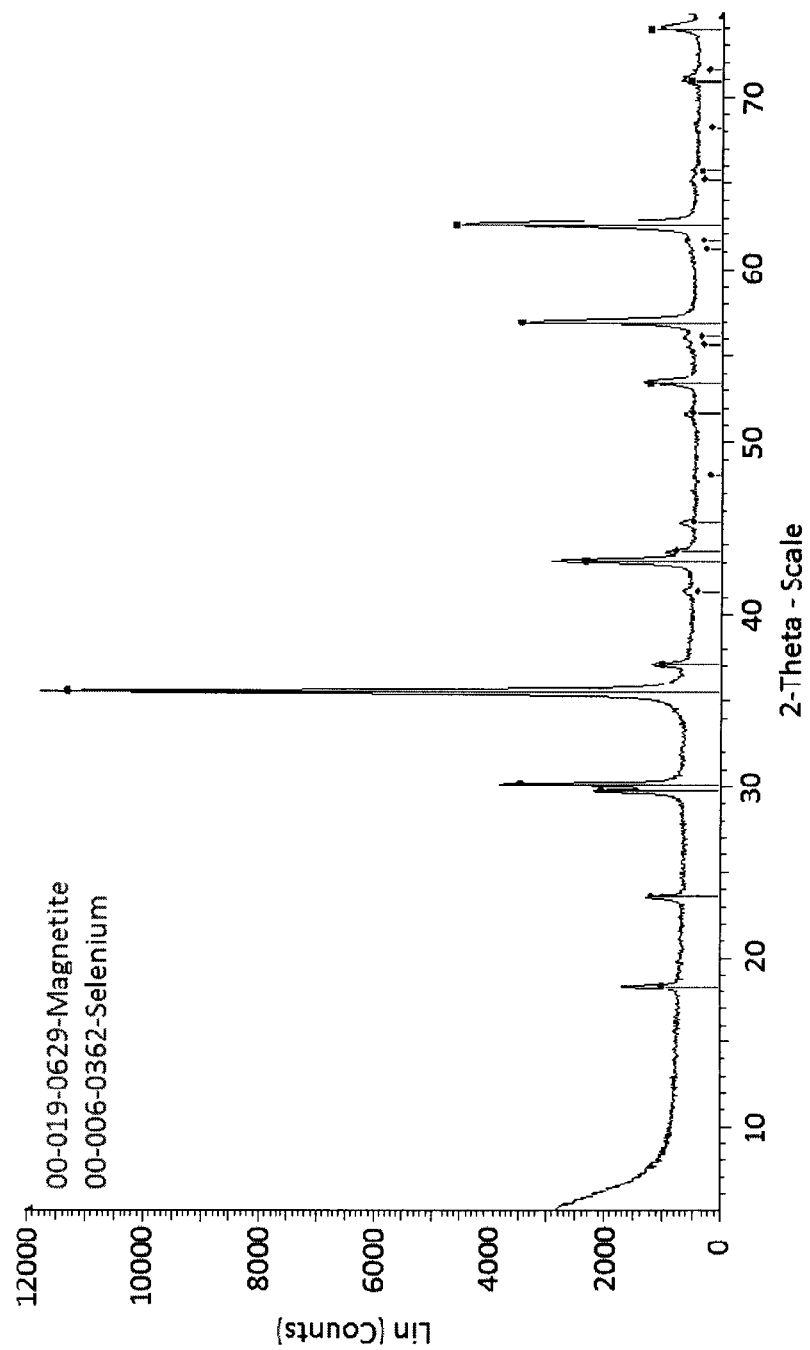

FIG. 14 presents the X-ray diffraction (XRD) spectrum of the final solid product (stream 302 of the process described in FIG. 6 showing that the final product comprises magnetite and elemental selenium.

DETAILED DESCRIPTION OF THE INVENTION

Definitions

Unless defined otherwise, all technical and scientific terms used herein have the same meaning as commonly understood by one of ordinary skill in the art to which this invention belongs.

As used herein, the term "about" refers to an approximately +/−10% variation from a given value. It is to be understood that such a variation is always included in any given value provided herein, whether or not it is specifically referred to.

The term "plurality" as used herein means more than one, for example, two or more, three or more, four or more, and the like.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, unrecited elements and/or process steps. The term "consisting essentially of" when used herein in connection with an apparatus or process, denotes that additional elements and/or process steps may be present, but that these additions do not materially affect the manner in which the recited apparatus or process functions. The term "consisting of" when used herein in connection with an apparatus or process, excludes the presence of additional elements and/or process steps. An apparatus or process described herein as comprising certain elements and/or steps may also, in certain embodiments consist essentially of those elements and/or steps, and in other embodiments consist of those elements and/or steps, whether or not these embodiments are specifically referred to.

It is contemplated that any embodiment discussed herein can be implemented with respect to any process or system described herein, and vice versa.

The present invention relates generally to processes for treating an aqueous solution to remove dissolved selenium oxyanions. The aqueous solution may be wastewater from various industrial processes for example from the mining, agriculture, power generation, or oil and gas industry sectors. In one aspect, the invention relates to a process for removing selenium oxyanions, including selenate, from an aqueous solution that includes an ion-exchange process in which the aqueous solution is passed over a strongly basic anion exchange resin to be concentrated and/or a selenium precipitation process in which the aqueous solution or the concentrated selenium-containing solution from the ion-exchange is contacted with ferrous iron or a ferrous/ferric iron mixture to form a co-precipitate comprising at least a portion of the iron and the selenium oxyanions.

Certain embodiments of the invention relate to processes that comprise ion exchange as a primary treatment step. In selected embodiments, ion exchange may be carried out so as to produce an effluent with a desired residual selenium concentration, for example below about 5 ppb, 4 ppb, 3 ppb, 2 ppb or 1 ppb. When regenerating the ion exchange media, the selenium removed from a wastewater may be concentrated into a relatively small volume of a spent regenerant solution. In selected embodiments, selenium may for example be concentrated into spent regenerant solution that is reduced in volume compared to the treated solution by one or two orders of magnitude.

In various embodiments, the spent ion exchange regenerant solution may be processed through a series of treatment steps to remove selenium from the regenerant, for example into a relatively small volume of a stable solid product. In selected embodiments, selenium may be immobilized into a solid product that is stable and suitable for disposal to non-hazardous waste landfills, or from which selenium could potentially be recovered, and the treated regenerant solution may be reused in the ion exchange process. In this way, processes of the invention may be carried out so as to reduce, or eliminate, liquid waste, and minimize reagent consumption.

Certain embodiments of the invention relate to processes for the rapid removal of selenium oxyanions, including selenate, from selenium laden aqueous solutions by contacting the aqueous solution with one or more iron-bearing streams comprising ferrous iron or a ferrous/ferric iron mixture to precipitate at least a portion of the iron and the selenium oxyanions and produce a selenium-iron precipitate, which can subsequently be separated from the aqueous solution.

In various embodiments, the ion-exchange and selenium precipitation processes described herein may be used on a stand-alone basis, may be used together, or may be used in combination with one or more other treatments for selenium removal. For example, the ion exchange process may be used as a primary or secondary selenium removal step to another selenium reduction/removal process, such as biological selenium removal, sorbent selenium removal, evaporation-crystallization selenium removal, or a combination thereof. Alternatively, or in addition, the ion exchange process may be used as a primary selenium removal step to the selenium precipitation process, such that the selenium precipitation process is used to treat selenium laden regenerant solution from the ion exchange process.

Similarly, the selenium precipitation process may be used as a primary or secondary step to another selenium removal process. For example, when very low concentrations of selenium are required in the final treated aqueous solution, the selenium precipitation process may be used as a secondary treatment for an integrated circuit. In certain embodiments, the precipitation process of this invention may be used to treat the spent regenerant or brine generated from a primary ion exchange, nanofiltration, reverse osmosis, or membrane treatment step or from any other primary/secondary treatment method that can achieve very low selenium concentrations in aqueous solutions. In some embodiments, the use of the selenium precipitation process as a primary treatment is contemplated. For example, the selenium precipitation process may be used to treat FGD blowdown wastewater.

In certain embodiments, the invention relates to processes for treating an aqueous solution to remove dissolved selenium oxyanions that comprise a primary ion exchange process and a secondary selenate precipitation process. The selenate precipitation process may be conducted in one or more flow-through cells. When a plurality of flow-through cells are used, they may be arranged in series or in parallel. In some embodiments, the one or more flow-through cells are electrolytic cells comprising iron anodes.

Certain embodiments of the invention relate to processes for treating a primary aqueous solution to remove dissolved selenium species. The solution may for example comprise a relatively low concentration of selenate anions, such as less than about 1,000 ppb. In alternative embodiments, this concentration may for example be less than about 100 ppb, 200 ppb, 300 ppb, 400 ppb, 500 ppb, 600 ppb, 700 ppb, 800 ppb or 900 ppb. Treatment of primary aqueous solutions comprising higher concentrations of selenium oxyanions, for example greater than 1,000 ppb, are also contemplated in some embodiments.

The primary aqueous solution may also include other anions, such as sulphate, nitrate, carbonate or bicarbonate, one or more of which may be present in an excess over the amount of selenium oxyanions. Typically, the primary aqueous solution will contain a major anion, which is present in excess over the other anions in the solution. In certain embodiments, the primary aqueous solution may include an excess of sulphate anions, for example at a concentration greater than 500,000 ppb. In alternative embodiments, this concentration may for example be greater than about 750,000 ppb, greater than about 1,000,000 ppb, greater than about 1,250,000 ppb or greater than about 1,500,000 ppb. In alternative embodiments, the primary aqueous solution may contain an excess of nitrate, an excess of carbonate, or an excess of bicarbonate.

In certain embodiments, the processes described herein are capable of reducing the concentration of selenium in the treated solution to below the limits required by the Canadian or U.S. regulatory agencies. For example, to below about 20 ppb, 15 ppb, 10 ppb, 5 ppb, 4 ppb, 3 ppb, 2 ppb or 1 ppb. In certain embodiments, the process may comprise both the ion exchange and selenium precipitation processes and be capable of reducing the selenium content in the treated solution to below 1 ppb.

In some embodiments, using a combination of ion exchange and selenium precipitation processes and optionally one or more downstream selenium removal processes may result in end products comprising magnetite and elemental selenium. In some embodiments, using a combination of ion exchange and selenium precipitation processes and optionally one or more downstream selenium removal processes may result in end products comprising magnetite and elemental selenium that are predominantly in crystalline form. As these end products are stable, in particular when in crystalline form, and thus are easier to handle, such embodiments can lead to cost savings over processes that produce less stable end products.

Certain embodiments of the ion exchange process involve passing the primary aqueous solution over a strongly basic anion exchange resin. The anion exchange resin over which the primary aqueous solution is passed will typically be loaded with an anion. This anion may be for example the major anion in the primary aqueous solution, or it may be a different anion. In certain embodiments, the anion exchange resin over which the primary aqueous solution is passed is loaded with the major anion present in the primary aqueous solution, for example, the anion exchange resin may in some embodiments be in a sulphate loaded form. Passing the primary aqueous solution over the loaded resin may for example be carried out under loading conditions that allow the selenate anions in the solution to displace the sulphate or other anion on the resin resulting in a selenate loaded ion exchange resin and an ion exchange discharge solution. The ion exchange discharge solution has a decreased selenium oxyanion concentration relative to the primary aqueous solution. The amount of the decrease will depend to some extent on the concentration of selenium oxyanions in the primary aqueous solution, but will typically be a decrease of at least 10-fold, for example, about 50-fold, 100-fold, 500-fold or 1,000-fold relative to the concentration of selenium oxyanions in the primary aqueous solution. In certain embodiments, the process parameters may be adjusted so that the ion exchange discharge solution has a desired selenate concentration, for example less than about 100 ppb. In alternative embodiments, this concentration may for example be less than about 90 ppb, 80 ppb, 70 ppb, 60 ppb, 50 ppb, 40 ppb, 30 ppb, 20 ppb, 10 ppb, 5 ppb or 1 ppb.

The selenate loaded resin may be treated with a regenerant solution having a relatively low selenate concentration, for example having a selenate concentration less than about 2,000 ppb. In alternative embodiments this concentration may for example be less than about 1,500 ppb, 1000 ppb, 500 ppb, 400 ppb, 300 ppb, 200 ppb or 100 ppb. In certain embodiments, the selenate concentration of the regenerant solution is equal to or lower than that of the primary aqueous solution. The regenerant solution may also have a relatively high concentration of the major anion in the primary aqueous solution. For example, the regenerant solution may have a relatively high concentration of sulphate, such as greater than about 10,000,000 ppb. In alternative embodiments this concentration may for example be greater than about 20,000,000 ppb, 30,000,000 ppb, 40,000,000 ppb, 50,000,000 ppb, 60,000,000 ppb or 70,000,000 ppb.

In certain embodiments, the regenerant solution contains a concentration of selenium that is approximately equal to that of the primary aqueous solution. Concentrations of selenium that are above or below the concentration of selenium in the primary aqueous solution are also contemplated in certain embodiments, for example, concentrations that are 30%, 25%, 20%, 15% or 10% above or below the concentration of selenium in the primary aqueous solution.

In some embodiments, in which the primary aqueous solution comprises a mixture of anionic species other than selenium oxyanions, the ratios of these anions in the regenerant solution may be approximately equivalent to the ratios in the primary aqueous solution, but the concentrations of other anionic species will be higher relative to the primary aqueous solution. Without being limited to any particular theory or mechanism, it is believed that using a regenerant solution that has similar ratios of anions other than selenium to those of the primary aqueous solution may improve the removal of selenium oxyanions by the ion exchange resin over other anionic species present.

In certain embodiments, the ratios of the other anions may be adjusted by altering the concentration of one of the anions, for example by addition of the selected anion into the regenerant solution, such that the selected anion becomes the major anion and displaces the selenate anions from the selenate loaded column. In certain embodiments, the ratios of the other anions may be adjusted by adding a further anion (that is not present in the primary aqueous solution) into the regenerant solution, such that the selected anion becomes the major anion and displaces the selenate anions from the selenate loaded column.

Regenerating conditions may be adjusted so that the major anion, for example sulphate, in the regenerant solution displaces selenate anions on the selenate loaded resin to produce a selenate loaded regenerant solution and a regenerated ion exchange resin loaded with the major anion. Typically, the selenate laden regenerant solution will have a selenium oxyanion concentration that is higher than the selenium oxyanion concentration of the primary aqueous solution. The amount of the increase will depend to some extent on the concentration of selenium oxyanions in the primary aqueous solution and on the operating conditions of the ion exchange process, but typically will be an increase of at least 2-fold, for example, about 5-fold, 10-fold or 100-fold relative to the concentration of selenium oxyanions in the primary aqueous solution. The selenate laden regenerant solution may for example have a relatively high selenate concentration, such as greater than about 1000 ppb, 2,000 ppb, 3,000 ppb, 4,000 ppb, 5,000 ppb, 6,000 ppb, 7,000 ppb, 8,000 ppb, 9,000 ppb or 10,000 ppb.

In the context of the characterization of the processes of the invention, the concentrations of selenium species are given on the basis of the concentration of atomic selenium in the relevant solutions, not the concentrations of the selenate or other selenium species. Elemental concentrations of atomic selenium in solutions may of course be measured directly in a number of ways. The concentrations of other chemical species, such as sulphate, are given in terms of the concentration of the molecular species. In addition, while the processes are primarily characterized as removing selenate from aqueous solutions, it is to be understood that other selenium oxyanions (such as selenite) may be present in the solutions being treated and may also be removed during the described processes.

In one aspect, the invention relates generally to a process for rapid removal of selenate from aqueous solutions by precipitation of the selenate with iron (either ferrous iron alone or in combination with ferric iron). Previously, ferrous iron has been used to reduce selenate to selenite, which can be further precipitated with ferric iron. However, the selenate reduction step is slow and associated with long retention times, typically in the order of several hours. In contrast, the process described herein allows for rapid removal of selenate from a solution with reduced retention times. Without being limited to any particular theory or mechanism, it is believed that the disclosed process involves precipitation of selenate by ferrous iron (and at alkaline pH and in presence of oxygen, also to some extent by ferric iron), rather than reduction of selenate to selenite and precipitation of the selenite by ferric iron, resulting in a more rapid removal of selenium.

Certain embodiments of the invention relate to a selenate precipitation process for removal of selenium oxyanions from an aqueous solution, the selenium oxyanions comprising Se(VI) species, that comprises contacting the aqueous solution with a source of ferrous iron or a ferrous/ferric iron mixture to co-precipitate the selenium oxyanions as a solid selenium-iron co-precipitate comprising Se(VI) and iron. In some embodiments, the selenate precipitation process results in the co-precipitation of at least 50% of the selenium oxyanions as a solid selenium-iron co-precipitate. In some embodiments, the solid selenium-iron co-precipitate forms in less than about 60 minutes, for example, in less than about 45 minutes, in less than about 30 minutes, less than about 15 minutes, or less than about 10 minutes.

Selenate removal rate by the described process does not require removal of oxygen as the process does not rely on chemical reduction of selenate. Accordingly, in certain embodiments, the process may be conducted in the presence of oxygen. For example, the process may be conducted in one or more reaction chambers that are not isolated from the atmosphere. Conducting one or more steps of the process in a reaction chamber that is isolated from the atmosphere and/or purged of oxygen however remains an alternative option in accordance with certain embodiments.

The process can be applied to a wide range of aqueous solutions, including those with high total dissolved solids (TDS). In some embodiments, the process may be used to remove selenate and other selenium oxyanions from solutions comprising a TDS in the order of g/L. The TDS may comprise, for example, one or more of sulphate, nitrate, carbonate, bicarbonate, and the like.

In general, the process comprises an initial contacting stage in which the aqueous solution to be treated is contacted with ferrous iron or a ferrous/ferric iron mixture under conditions effective to precipitate at least a portion of the ferrous/ferric iron and the selenium oxyanions, including selenate, from the aqueous solution. This precipitation takes place rapidly and the resultant selenium-iron precipitate, which is typically a small volume relative to other streams, is then separated from the aqueous solution. The treated aqueous solution may be transferred for further downstream treatment and/or use. The selenium-iron precipitate may be transferred downstream for disposal and/or further treatment, or it may be recycled back into the contacting stage in order to maximize the selenium removal capacity of the iron solids.

In certain embodiments, the initial contacting stage may employ ferrous iron alone. In some embodiments, mixed ferrous and ferric iron solids are employed in the initial contacting stage.

The contact time required for contacting the aqueous solution to be treated with ferrous iron or a ferrous/ferric iron mixture may vary according to the particulars of the situation, but in certain embodiments in which rapid removal of selenate is desirable, the contact time may be kept short, for example, less than about 60 minutes. In some embodiments, contact times of 60 minutes or less, 50 minutes or less, 40 minutes or less, 30 minutes or less, 20 minutes or less, 10 minutes or less, or any amount therebetween, may be employed. In certain embodiments, the contact time may be between about 5 minutes, 10 minutes, 20 minutes or 30 minutes and about 90 minutes, for example, between about 5 minutes, 10 minutes, 20 minutes or about 30 minutes and about 75 minutes, or between about 5 minutes, 10 minutes, 20 minutes or about 30 minutes and about 60 minutes.

In certain embodiments, the process is capable of achieving removal of at least 50% of the selenium oxyanions from the aqueous solution to be treated in a contact time of 90 minutes or less, for example, 75 minutes or less, or 60 minutes or less, 45 minutes or less, 30 minutes or less, 20 minutes or less, 10 minutes or less, or any amount therebetween. In some embodiments, the process is capable of achieving removal of 50% or more of the selenium oxyanions from the aqueous solution to be treated in a contact time of 60 minutes or less, for example, removal of 55%, 60%, 65%, 70%, 75%, 80%, 85%, 90%, or any amount therebetween, of the selenium oxyanions. Without being limited to any particular theory, it is believed that in the step of contacting the aqueous solution to be treated with a source of ferrous iron or a ferrous/ferric iron mixture achieves removal of the selenium oxyanions by co-precipitation and/or adsorption of the selenium oxyanions and the ferrous or ferrous/ferric iron.

When the process is operated as a flow-through or continuous system in which the aqueous solution is brought in contact with a stream of ferrous iron or a ferrous/ferric iron mixture in a mixing chamber, the contact time described above can be defined by the retention time, for example, the hydraulic retention time (HRT), in the mixing chamber. Accordingly, in certain embodiments hydraulic retentions times of between about 5 minutes, 10 minutes, 20 minutes or 30 minutes and about 90 minutes, for example, between about 5 minutes, 10 minutes, 20 minutes or about 30 minutes and about 75 minutes, or between about 5 minutes, 10 minutes, 20 minutes or about 30 minutes and about 60 minutes, or any range therebetween, are contemplated.

The step of contacting the aqueous solution with ferrous iron or a ferrous/ferric iron mixture may be conducted at a range of temperatures. Various operating temperatures are contemplated ranging from the freezing point to the boiling point of the treated solution. The efficacy of the precipitation is not dependent on the application of heat and in some embodiments, therefore, the process may be conducted at a temperature below 35° C. In some embodiments, temperatures as low as 5° C. may be used. In some embodiments, the process may be conducted at a temperature between about 5° C. and about 35° C., for example, between about 5° C. and about 30° C., 25° C., 24° C., 23° C., 22° C., 21° C., or 20° C., or any temperature therebetween. In some embodiments, the process may be conducted at ambient temperature.

Conducting the process at temperatures above 35° C., however, is also effective and thus is contemplated in certain embodiments. In some embodiments, the process may be conducted at a temperature between about 15° C. and about 50° C.

While not being bound by any particular theory, it is believed that the total amount of iron added at the contacting stage may influence the time required to form the selenium-iron precipitate. Accordingly, in certain embodiments, the process may require a minimum amount of total iron be added in the contacting step, for example, a minimum amount of 100 mg/L total iron. In some embodiments, the minimum amount of total iron added in the contacting step may be about 250 mg/L, 500 mg/L, 1 g/L, 1.5 g/L, 2 g/L or 2.5 g/L, or any amount therebetween.

In certain embodiments in which selenium:iron solids separated downstream are recycled back into the contacting stage, the recycled solids will contribute to the total iron present in the contacting step. In such embodiments, the amount of iron added from external sources may be lower than in those embodiments in which no recycling takes place. In general, however, the amount of total iron in the contacting step is between about 100 mg/L and about 50 g/L. In some embodiments, the amount of total iron in the contacting step may be between about 250 mg/L and about 50 g/L, for example, between about 500 mg/L and about 50 g/L, between about 1 g/L and about 50 g/L, between about 1.5 g/L and about 50 g/L, or between about 2 g/L and about 50 g/L, or any range therebetween.

Selection of an appropriate minimum amount of total iron to achieve a desired amount of selenium removal can be readily made by the skilled worker in view of the disclosure herein. Typically, a total iron content in the contacting stage that is in the higher end of the disclosed ranges will be required to remove high proportions of the selenium oxyanions (i.e. achieve a higher % removal), whereas lower total iron contents may be used when lower amounts of selenium removal are acceptable.

The minimum amount of total iron added as described above may include just ferrous iron, but more typically includes ferrous iron and some ferric iron. In certain embodiments, the step of contacting comprises contacting the aqueous solution with a mixture of ferrous and ferric iron. When a mixture of ferrous and ferric iron is employed, it is preferred that the ratio of ferrous:ferric iron employed is 1:1 or greater. In certain embodiments, the ratio of ferrous:ferric iron employed is 1.5:1 or greater, 2:1 or greater. 2.5:1 or greater, or 3:1 or greater. In certain embodiments, a minimum ratio of 1:1 is employed and the ratio of ferrous:ferric iron is between about 1:1 and about 10:1, for example, between about 1:1 and about 10:1, between about 1:1 and about 9:1, between about 1:1 and about 8:1, between about 1:1 and about 7:1. In some embodiments, a minimum ratio of 2:1 is employed and the ratio of ferrous:ferric iron is between about 2:1 and 10:1, for example, between about 2:1 and 8:1, between about 2:1 and 7:1, between about 2:1 and 6:1 or between about 2:1 and 5:1. In some embodiments, a minimum ratio of 3:1 is employed and the ratio of ferrous:ferric iron is between about 3:1 and 10:1, for example, between about 3:1 and 7:1, between about 3:1 and 6:1, between about 3:1 and 5:1, or between about 3:1 and 4:1.

The selenate precipitation process may be conducted at a range of pH, for example, at a pH between pH7 and pH13. In certain embodiments, a pH between about pH7.5 and pH13 is employed. In some embodiments, a pH between about pH7.5 and about pH12, between about pH8 and about pH12, between about pH8 and about pH11, between about pH8 and about pH10.5, or between about pH8 and about pH10, is employed. In some embodiments, using a pH between about pH8 and about pH9, for example between about pH8.5 and about pH8.8, allows selenium removal to be maximized.

The source of iron can be ferrous, and optionally ferric, salts, for example provided as leaching scrap iron and/or from a stock solution of ferrous, and optionally ferric, salts. Alternatively, an electrolytic cell with an iron anode may be used. The iron anode electrolytic cell serves as an inexpensive reagent source (iron and hydroxide) and may also in some embodiments considerably reduce the quantity of iron required to capture selenium due to the unique conditions in the cell that improve selenium capture by iron solids. In this case, the anode may be made of any low carbon iron alloy or may be made of scrap iron.

In certain embodiments, the source of ferrous, and optionally ferric, iron is an acidified source and the iron is precipitated in the mixing stage by raising the pH, for example to pH7 or above. In certain embodiments, the source of ferrous, and optionally ferric, iron is an alkaline source, in which case the iron is typically in hydroxylated form and may also remove selenium through adsorption processes.

In some embodiments, an electrolytic cell is used as the source of ferrous, and optionally ferric, iron. In this case, the ferrous/ferric iron can be provided at higher pH as the ferrous/ferric iron can locally transform between its dissolved form and its precipitated form (hydroxylated) in the electrolytic cell. This action can enhance selenate capture as it is a dynamic precipitation promoted by the electrolytic cell.

The process may be employed as a batch method of selenium removal or it may be implemented as a continuous process. In certain embodiments, the process is implemented as a continuous process with the aqueous solution for treatment being brought into contact with a stream comprising ferrous iron or a ferrous/ferric iron mixture in a mixing chamber. In some embodiments, the process includes a recycling step in which the separated selenium-iron precipitate is returned to the mixing chamber for further contact with the aqueous solution in order to maximise the selenium removal potential of the ferrous and ferric solids. In some embodiments, in which an electrolytic cell is used to provide ferrous iron or a ferrous/ferric iron mixture, the electrolytic cell itself may be the mixing chamber and the process may optionally further comprise recycling of the separated selenium-iron precipitate back into the electrolytic cell.

Certain embodiments of the invention relate to a selenate precipitation process that comprises introducing a selenate laden solution into one or more electrolytic cells in the presence of ferrous iron or a mixture of ferrous and ferric iron. When a plurality of electrolytic cells are employed, they may be arranged in series or in parallel.

The selenate laden solution may be introduced into an electrolytic cell, for example in the presence of ferrous sulphate. Alternatively, the electrolytic cell may comprise an iron anode which acts as a source of ferrous or ferrous/ferric iron. The concentration of ferrous species in the cell may be adjusted to provide conditions for precipitation of selenium oxyanions, including selenate, to form a selenium-iron (Se—Fe) precipitate, for example by providing ferrous salt concentrations within the electrolytic cell of between 0.1 and 30 g/L, or of any integer value between about 0.1 and about 30 g/L.

The electrolytic cell discharge solution has a reduced concentration of selenate relative to the selenate laden solution introduced into the electrolytic cell, for example, the concentration of the discharge solution may be 2-fold, 5-fold or 10-fold less than the concentration of selenate in the selenate laden solution. In some embodiments, concentration of selenate in the discharge solution may be, for example, less than about 2,000 ppb dissolved selenate. In alternative embodiments this concentration may for example be less than about 1,500 ppb, 1,000 ppb, 500 ppb, 200 ppb, 100 ppb or 50 ppb.

Selenium solids may be separated from the electrolytic cell discharge solution to produce a selenium-depleted solution. An additional precipitation step or steps may also be included in some embodiments in order to maximize the formation of Se:Fe precipitate. The selenium-depleted solution may optionally be recycled back into the process for example, when the selenate precipitation process is combined with ion exchange, the selenium-depleted solution may form at least part of the regenerant solution for treating the selenate loaded ion exchange resin.

In certain embodiments, the separated selenium solids which comprise the selenium-iron (Se—Fe) precipitate are recycled back into the electrolytic cell or into a reactor downstream of the electrolytic cell, optionally with one or more intervening treatment steps. Recycling the Se—Fe solids allows the selenium removal capacity of the iron to be maximized and for the settling rate of the solids to be improved. The recycled solids will typically include both ferrous and ferric iron. Accordingly, in some embodiments, the process comprises precipitation of selenium oxyanions, including selenate, by contacting the aqueous solution to be treated, for example selenate loaded ion exchange regenerant solution, with mixed ferrous and ferric iron.

In certain embodiments, the selenium laden solution treated in the selenate precipitation process may for example include $Na_2SO_4$, for example at pH 2 to 13, pH2 to 10, or pH6 to 8. Alternatively, the solution may be a mixture of ferrous salts and sodium sulphate. When the solution does not contain ferrous iron, the process may further include a step of passing the selenate laden solution over a nanofiltration membrane, so as to reduce the concentration of monovalent ions (including $NO^{3-}$ and $Cl^-$) and increase the concentration of selenate ions in the retentate portion of the solution that is fed into the electrolytic cell.

In some embodiments, ferrous salts may be added to the selenate laden solution before introducing the solution into the electrolytic cell, so as to maintain ferrous concentrations within the electrolytic cell, for example to between 0.1 and 30 g/L. In certain embodiments in which the Se—Fe solids are recycled, the Se—Fe solids contribute to the amount of iron in the electrolytic cell and the total amount of iron in the electrolytic cell, including ferrous sulphate from the solution and iron from the Se—Fe solids, is maintained between about 0.1 and 30 g/L.

When the solution to be treated contains a mixture of ferrous sulphate and sodium sulphate then nanofiltration is generally not required and the entire selenium laden stream may report directly into the electrolytic cell. The concentration of ferrous iron in the regenerant may be maintained by addition of ferrous sulphate or other ferrous salts.

In alternative embodiments, the primary aqueous solution may be treated with ferrous or ferrous/ferric iron without prior concentration by ion exchange or other processes. This may be advantageous, for example, when the primary aqueous solution requires treatment at relatively low flow rates, or has relatively high selenate concentration, for example a selenate concentration greater than about 200 ppb, 300 ppb, 400 ppb or 500 ppb. As recited in the context of processes that include ion exchange, the primary aqueous solution may have relatively high sulphate concentrations, such as greater than about 100,000 ppb. The primary solution may be introduced into a flow-through cell in the presence of ferrous iron concentrations of between 0.1 and 30 g/L, precipitating at least a portion of the selenate to produce a discharge solution comprising a Se:Fe precipitate and having for example less than about 2,000 ppb dissolved selenate. Selenium solids may be separated from the discharge solution to produce a selenium-depleted discharge solution. An additional precipitation step or steps may also be included in some embodiments in order to maximise the formation of Se:Fe precipitate.

As described herein, it has been found that Fe:Se solids have additional capacity for selenium removal and can be used effectively to remove selenium from a selenium-containing aqueous solution. Accordingly, certain embodiments relate to methods of removing selenium from an aqueous solution comprising contacting the aqueous solution with Fe:Se solids. Such methods may, for example, be integrated into existing selenium removal processes as a recycling step in which the Fe:Se solids generated by the initial process are cycled back into contact with the treated aqueous solution in order to remove additional selenium. Such recycling of the Fe:Se solids may thus improve the overall efficiencies of the process.

Ion-Exchange Process

Figure 1:
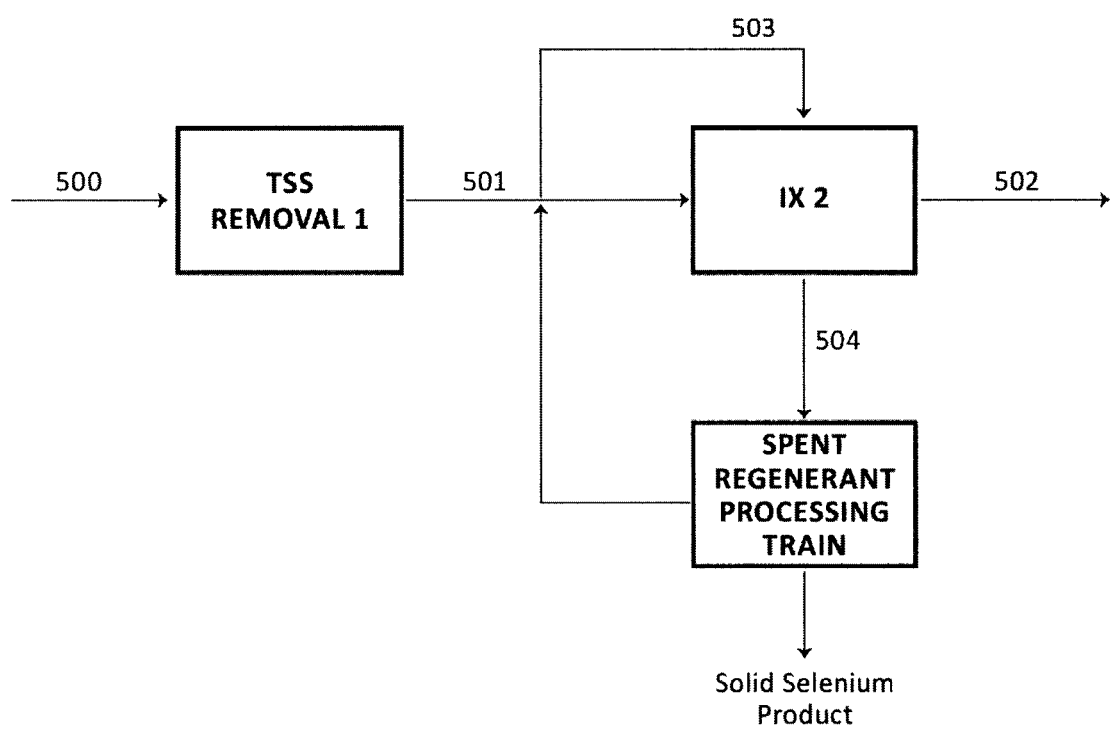
FIGS. 1-3 are flow charts of processes for removal of selenate in various embodiments of the invention.
Figure 2:
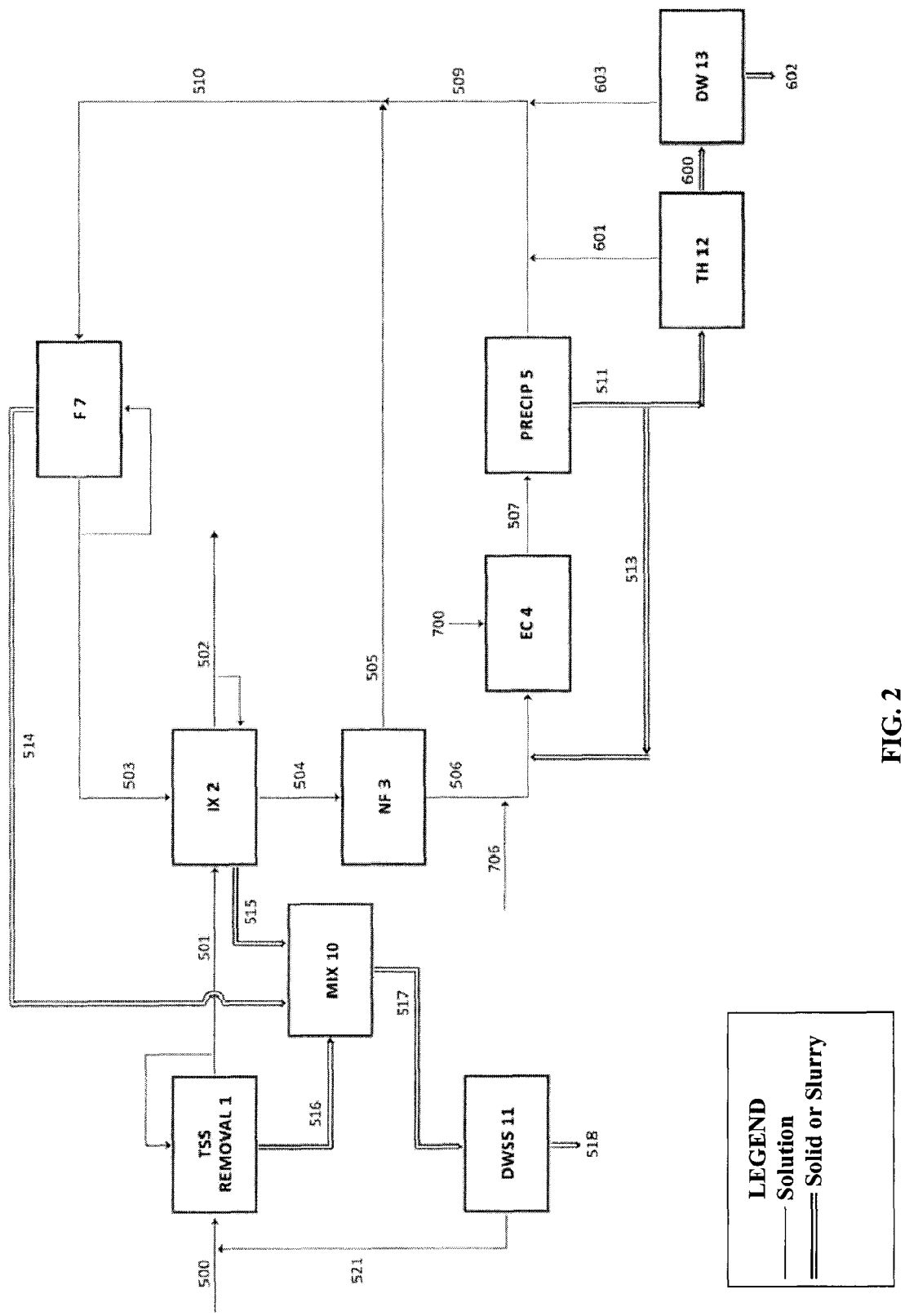

Certain embodiments of the invention relating to an ion exchange process for removal of selenium oxyanions are depicted in FIGS. 1 to 3. In one embodiment, as illustrated in FIG. 1, selenium laden water stream 500 passes through a suspended solids removal Step 1 where solids are removed by conventional settling and filtration as required depending on solids loading in the water. The design of Step 1 may be such that stream 501 contains less than 5 ppm residual suspended solids and the majority of the residual solids have particle size less than 10 micron. Next, stream 501 passes through an ion exchange (IX) Step 2 that removes selenium oxyanions from the treated water. In selected embodiments, the ion exchange step may be carried out under conditions that produce discharge water 502 containing less than 5 ppb of total selenium.

In selected embodiments, the resin used in the ion exchange step may be a strong base anion (SBA) type resin. When loaded with selenium species, the SBA resin used in Step 2 may be regenerated, and selenium captured by the resin from feed water is thereby eluted, for example using a small volume of an aqueous solution 503. Regeneration of the SBA resin accordingly produces a relatively small volume of concentrated selenium solution for further processing.

The composition of the regenerant solution 503 may be adapted for the type of SBA resin and anionic species present in water stream 500. For example, many mining wastewaters contain sulphate as the main anion, and most Type 1 SBA resins have a higher affinity for sulphate compared to chloride. In these situations, the stream 503 contains sulphate as the main anion and Na, K, Mg, and Fe, as the respective main cations. Secondary anionic constituents present in 503 in these situations may include one or more of nitrates, carbonates, bicarbonates and chlorides depending on the feed water composition and pH.

In selected embodiments described herein, sulphate is the main anion constituent in 503, i.e. an anionic constituent with the highest concentration in regenerant solution 503 compared to other anionic constituents present in regenerant solution 503. The volume of the regenerant solution 503 depends on the regenerant composition and process, but may in some embodiments vary from 2 to 7 resin bed volumes (BV), for example 2 to 5 resin BV. The regeneration process may be carried out so that the spent regenerant solution 504 contains selenate and selenite ions at concentrations that are at least one order of magnitude greater than the corresponding concentrations in the incoming water stream 500. For example, if the incoming feed stream 500 contains 400 ppb of selenium, the regeneration process may be carried out so that spent regenerant stream 504 contains from 4,000 ppb up to 20,000 ppb of selenium. The spent regenerant stream 504 is then processed through a series of treatment steps to remove selenium from the spent regenerant, for example in the form a solid selenium product, and thereby produce a barren regenerant solution substantially free of selenium or with reduced selenium. The barren regenerant solution may then be recycled back to the ion exchange step 2. This is schematically shown in FIG. 1, where a variety of different treatment steps are collectively represented in the box labelled "Spent Regenerant Processing Train."

In alternative embodiments, as discussed below, the configuration of the spent regenerant processing train, including the sequence of treatment steps and reagent additions may be varied depending on the composition of the regenerant solution and the selection of the type of electrodes used in the electrolytic cell (EC) that may form a part of the regenerant processing train.

In one variant of the regenerant processing train, a solution containing 20 to 120 g/L $Na_2SO_4$ at pH 2 to 10, or in the alternative at pH 4 to 8 or pH 6 to 8, is used as the ion exchange regenerant 503. In one variant of the regenerant processing train, an EC with an iron anode may be used. The iron anode may be made of scrap iron or a variety of low carbon alloys. In selected embodiments, other active materials can be used as the anode: zinc and copper are examples of this. FIG. 2 provides the detailed process block diagram for this process embodiment. As illustrated in FIG. 2, in this process, the spent ion exchange regenerant 504 may optionally be directed first to a nanofiltration (NF) membrane unit Step 3. The NF unit may be adapted to ensure that the majority of monovalent ions pass through the membrane into the permeate stream 505 while rejecting multivalent ions including selenium oxyanions which subsequently concentrate in the retentate stream 506. In this way, the sodium derived from the sodium sulphate regenerant solution is made to bypass the EC. The retentate may be introduced into an electrolytic cell shown as Step 4. Although adaptable to the processes of this invention, the use of a NF unit is not necessary in all embodiments.

In variants of the process, a solution containing a mixture of Na2SO4 and FeSO4 may be used as the ion exchange regenerant 503. In embodiments of this kind, the total sulphate concentration in 503 may for example range from 15 to 100 g/L, or in the alternative from 25 to 85 g/L. In certain embodiments, the majority of iron required for the operation of the EC cell with the non-Fe electrode may be supplied by ion exchange regenerant 503. Stream 706 accordingly serves as a make-up source of iron, when needed, which may for example be added in a pure form in order to maintain the concentration of ferrous iron in the electrolyte inside the EC cell, for example at concentrations between about 2 and 30 g/L, for example between about 10 and 25 g/L. The purpose of maintaining ferrous iron concentration at a certain threshold is to achieve fast selenate removal kinetics in the EC while controlling the conditions in the vicinity of the anode.

Stream 706 can be used but is generally not required when the EC operates with an iron anode. This is because the iron anode itself serves as the source of ferrous iron whereby the main anodic reaction in the EC involves the oxidation of elemental iron from the anode surface to ferrous iron in solution.

In selected embodiments, the EC operates with an iron anode and any one of a variety of cathodes, including iron, stainless steel, titanium or other electrically conductive materials. In selected embodiments, flow-through EC designs may be used, for example ECs that are suitable for direct electrowinning of metals from solution or electrocoagulation. Although some form of physical separation between cathode and anode may be employed in the EC, it is not necessary in all embodiments and the anode and cathode may accordingly be resident in the same electrolytic solution.

In some embodiments, the hydraulic retention time (HRT) in the EC is relatively short, and may for example be adapted to depend on the concentration of selenate in stream 506 (FIG. 2). A selected HRT in the EC may for example be in the order of about 5 to 90 minutes, or in alternative embodiments between about 10 minutes, 20 minutes or 30 minutes and about 90 minutes; or between about 5 minutes, 10 minutes, 20 minutes or about 30 minutes and about 75 minutes; or between about 5 minutes, 10 minutes, 20 minutes or about 30 minutes and about 60 minutes. The parameters of the operation of the EC in the overall process may be adapted to provide conditions under which the removal of selenium oxyanions with ferrous and ferric iron is relatively high, and the kinetics of this reaction are relatively fast.

In select embodiments, the percentage removal of selenate achieved in the EC is in the order of at least 50%, for example, about 60% or about 70 to 100%, or in the alternative in the order of about 90 to 95%. In this way, the process may be adapted so that discharge from the EC contains less than 2 ppm residual dissolved selenate, for example less than 1 ppm, 500 ppb, 250 ppb or 100 ppb.

In selected embodiments, an additional selenium precipitation Step 5 is employed, that may include a solid-liquid separation that separates selenium solids generated in the regenerant processing train. The solid liquid separation may for example be aided by flocculants. In some embodiments, Step 5 precipitation may be conducted under an inert atmosphere, such as a nitrogen atmosphere. Conducting Step 5 precipitation in the presence of oxygen is also contemplated in certain embodiments.

Stream 511 produced in Step 5 may contain selenium and iron solids in a slurry stream that is directed to a dewatering Step 13 which produces a final solid cake 602 containing Fe:Se, for example in a weight ratio of approximately 5:1 to 1000:1, and in select embodiments in a weight ratio of 10:1. Conventional dewatering equipment such as plate and frame filter presses or centrifuges may for example be used for Step 13.

In the embodiment of FIG. 2, the EC can operate under a relatively wide pH range, for example from about 1.5 to 11. In select embodiments, the pH in the EC cell may be maintained so that it is about 8 or higher, for example between 8 and 10, in order to maximize the kinetics of selenate removal and minimize the amount of iron released from the iron anode into the electrolyte. The pH in the EC may have a tendency to rise and $H_2SO_4$ may be added to the cell via stream 700 to help maintain the pH in the desired range.

In the embodiment of FIG. 2, slurry 511 containing iron and selenium solids produced in Step 5 may have a ratio of Fe:Se which is greater than about 10:1, and in order to reduce the tonnage of waste solids that contain selenium and/or purify the selenium solids to allow selenium recovery from this product, stream 511 may be subject to further processing, for example using Step 12 prior to dewatering.

In the embodiment of FIG. 2, slurry 511 is directed to Step 12. Step 12 is a thickening step which produces a slurry stream 600 with a higher solids content than 511, and a solution 601 that is directed to Step 7. Thickened slurry 600 is then directed to the final dewatering step 13 which produces the final selenium iron solids cake 602 and a solution containing sulphate 603.

In embodiments of the invention illustrated in FIG. 2, there are three steps in the overall process that either produce or may produce "backwash" streams laden with suspended solids, including Step 1, Step 2, and Step 7. In FIG. 2, these backwash streams are shown as streams 514, 515, and 516. As illustrated, these streams are combined in Step 10. The blended solids are then directed to Step 11. In Step 11, blended solids are dewatered, for example using conventional dewatering equipment such as a plate and frame filter press or a centrifuge, producing a solids cake 518. In alternative embodiments, depending for example on the quantity and composition of solids in 518, these solids can be either blended with 602, or disposed of separately. As illustrated, filtrate produced in Step 11 may report via 521 to the plant feed stream 500.

In certain embodiments in which an IX regenerant comprising a mixture of $Na_2SO_4$ and $FeSO_4$ solution is used, the pH of the solution may tend to rise during resin regeneration. Depending for example on the concentration of ferrous iron in the regenerant and the regenerant pH, solids may form in the spent IX regenerant, which may contain not only iron but also selenium. Accordingly, in some embodiments an optional separation step prior to or after Step 3 may be included to separate the solids from the solution. Optionally, $H_2SO_4$ can be added to stream 503 upstream of the IX Step 2 in order to minimize the risk of solids formation in the resin bed during regeneration. In some embodiments, acid addition may be required only during the early stage of resin regeneration and may accordingly be added to approximately the first bed volume of the regenerant 503 entering IX step 2.

In selected embodiments, a mixed metal oxide coated (MMO) anode may be used in the electrolytic cell (EC). A non-limiting example of a MMO anode is a dimensionally stable anode (DSA®), but anodes with other mixed metal oxide coatings may also be employed. In alternative embodiments, the MMO anode may for example be made by applying mixed metal oxide coatings to substrates, or by using the following materials as the anode materials: noble metals (titanium, gold, platinum), and carbon (including graphite). FIG. 3 provides the detailed process block diagram for this process embodiment. As illustrated in FIG. 3, in this process, the spent ion exchange regenerant 504 is directed first to a nanofiltration (NF) membrane unit Step 3. The NF unit may be adapted to ensure that the majority of monovalent ions pass through the membrane into the permeate stream 505 while rejecting multivalent ions including selenium oxyanions which subsequently concentrate in the retentate stream 506. In this way, the sodium derived from the sodium sulphate regenerant solution is made to bypass the EC. The retentate may be introduced into an electrolytic cell shown as Step 4.

In selected embodiments, the EC operates with an MMO anode and any one of a variety of cathodes, including iron, stainless steel, titanium or other electrically conductive materials. In selected embodiments, flow-through EC designs may be used, for example ECs that are suitable for direct electrowinning of metals from solution or electrocoagulation. Although some form of physical separation between cathode and anode may be employed in the EC, it is not necessary in all embodiments and the anode and cathode may accordingly be resident in the same electrolytic solution.

As illustrated in FIG. 3, ferrous sulphate may be added to stream 506 via stream 513 and 706 prior to feeding stream 506 into the EC. In selected embodiments, the majority of ferrous iron required for the operation of the EC cell with the MMO anode may be supplied via stream 513 which is an internal process stream recycled from steps 6 and 9. Stream 706 accordingly serves as a make-up source of $FeSO_4$ which may for example be added in a pure form in order to maintain the concentration of ferrous iron in the electrolyte inside the EC cell, for example at concentrations between 2 and 30 g/L, or in the alternative between 10 and 25 g/L. The purpose of maintaining ferrous iron concentration at a certain threshold is to achieve fast selenate reduction kinetics in the EC while controlling the conditions in the vicinity of the anode. To achieve this operational parameter, the selected concentration of ferrous iron may be adjusted to depend, for example, on the amount of nitrate and/or perchlorate present in the incoming stream 500 and the type of SBA resin selected. In general, the higher the concentration of nitrate in the incoming stream and the lower the selectivity of the SBA resin for selenate and selenite over nitrate used in Step 2, the higher the concentration of ferrous iron required in the EC.

As shown in FIG. 3 in some embodiments a second precipitation step (Step 6) may be required, where residual species in 508 are precipitated and pH can be adjusted and controlled, for example by NaOH addition to Step 6 via stream 702, or acid addition into Step 6 via 703. In selected embodiments, some or all of the iron solids that are separated from 508 in Step 6 may be directed to the reduction-acidification (RA) Step 9 via stream 512. In Step 9, $H_2SO_4$ may be added via stream 704, and a reductant may be added via stream 705. In alternative aspects, a number of different reductants may be used in Step 9, including for example sodium metabisulphite and sodium hydrosulphide.

Selenate Precipitation Process

Certain embodiments of the invention relate to a selenate precipitation process that generally comprises a contacting stage in which selenate in a selenium laden aqueous stream is brought into contact with ferrous iron or a ferrous/ferric iron mixture, for example, from an acidified concentrated ferrous stream, from an alkaline ferrous/ferric source or from an electrolytic cell with an iron anode, in a mixing chamber. The pH in the mixing chamber is adjusted to allow for selenate removal with ferrous and ferric solids. As described above, selenate removal through this process can be achieved in a pH range between pH7 and pH13. In certain embodiments, a pH between about pH8.5 and about pH8.8 may be employed to optimize selenate removal.

Shortly after contacting the selenium laden stream with the ferrous iron or mixed ferrous/ferric iron stream, the unified stream leaves the mixing chamber and reports to a solids/liquid separation stage. The selenium laden solids can optionally be recycled back to the mixing chamber or to a downstream reactor from the solids/liquid separation stage in order to exhaust the capacity of the solids for removing selenate. In certain embodiments, recycling the solids may also improve the speed with which the selenium oxyanions are removed and/or amount of selenium oxyanions removed from the selenium laden stream in the mixing chamber, thus allowing for lower retention times to be employed. In certain embodiments, recycling the solids may improve the settling rate of precipitated material. Recycling of the solids may also, therefore, improve the operating costs and/or the quality of the final solid selenium bearing product (for example by reducing the iron:selenium ratio).

Certain embodiments contemplate the use of multiple mixing tanks, however, this is optional as the selenate removal process is fast and increasing retention time may not result in significant added benefits. Accordingly, in some embodiments, a single mixing chamber is employed.

In general, higher concentrations of selenate in the aqueous solution for treatment should be matched with higher concentrations of iron in the contacting stage. A minimum total iron concentration of about 100 mg/L is generally employed, however, one skilled in the art will appreciate that the minimum total iron concentration should be adjusted as a function of initial selenium concentration and final selenium target. In certain embodiments, the total iron concentration employed in the contacting stage is between about 100 mg/L and about 50 g/L.

While addition of ferrous iron or ferrous/ferric iron mixture will result in selenium removal from the aqueous solution, the percentage of the removal may be influenced by the iron:selenium (Fe:Se) ratio. For example, even though a lower quantity of iron is generally required to remove lower quantities of selenium, a low initial selenium concentration will typically require a higher Fe:Se ratio and the final Fe:Se ratio in the solids will be higher. By way of example, the experiments described herein show that with an initial selenium concentration of 4 ppm and removal of >80% selenium, the total iron used was >1000 ppm (i.e. a Fe:Se ratio of >300:1), however, with an initial selenium concentration of 100 ppm and removal of >95% selenium, the total iron used was <5000 ppm (i.e. a Fe:Se ratio of <50:1). Accordingly, in certain embodiments, the total amount of iron added in the contacting stage is selected to provide a Fe:Se ratio of at least 5:1, for example, between about 5:1 and about 300:1, between about 5:1 and about 100:1, or between about 5:1 and 50:1.

Selenate removal is possible at a range of ferrous:ferric ratios in the mixing chamber, but the ratio is preferably at least 1:1 ferrous:ferric. In certain embodiments, ferrous:ferric ratios of 1:1 or higher, are employed, for example, between about 1:1 and about 5:1, or between about 1:1 and about 4:1. In some embodiments, ferrous:ferric rations of between about 2:1 and 5:1 are employed. In some embodiments, ferrous:ferric ratios in the range of about 2:1 to about 4:1 are employed.

Figure 4:
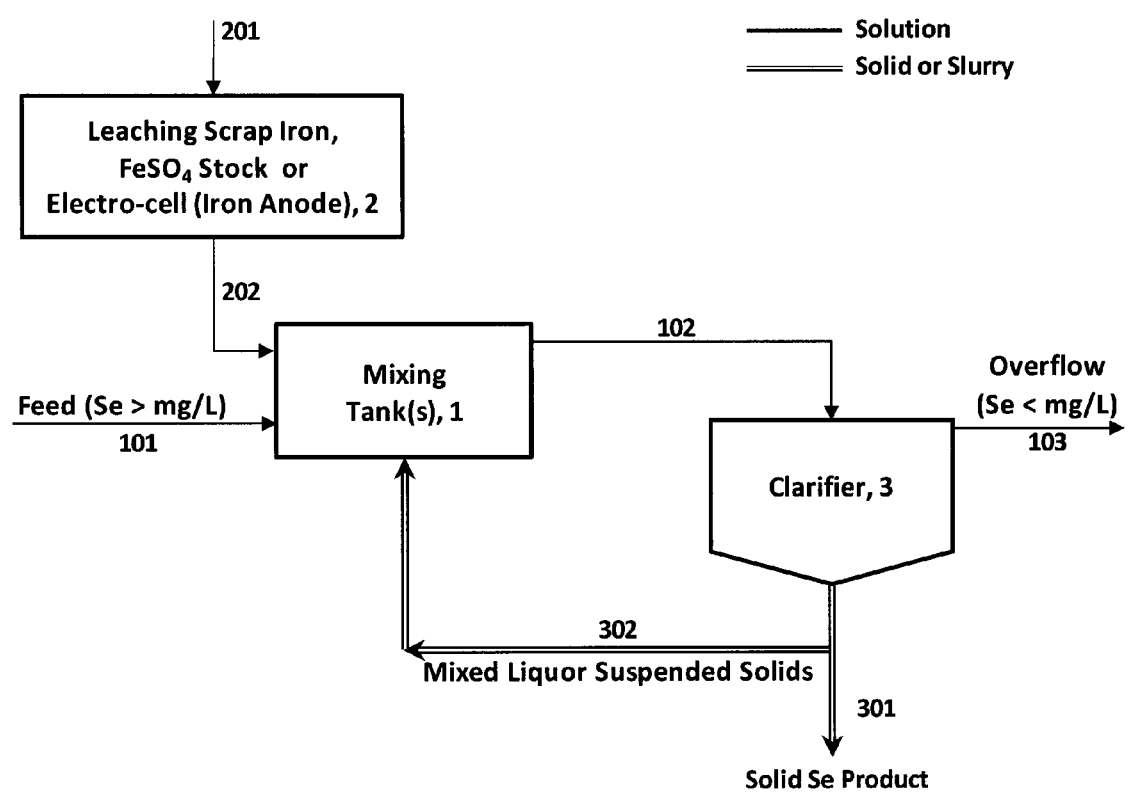
FIG. 4 presents a process for rapid bulk removal of selenate in accordance with one embodiment in which a source of ferrous iron or mixed ferrous/ferric iron is separated from the re-circulating portion of the circuit.

One embodiment of the disclosed selenate precipitation process is shown in FIG. 4. In Stage 1, selenium laden solution, stream 101, enters the mixing tank and is brought into contact with iron bearing streams 202 and 302. Iron bearing stream 202 contains ferrous iron or a ferrous/ferric iron mixture generated in Stage 2. Ferrous or ferrous/ferric iron can be generated in a number of ways including, but not limited to, leaching iron, such as scrap iron, or by an electrolytic cell that uses an iron-based anode. Alternatively, ferrous or ferrous/ferric iron may be provided from a stock solution of ferrous salts, such as $FeSO_4$.

Stream 201 that is provided to Stage 2 contains background electrolyte, which may be similar or different to that of stream 101. In certain embodiments, the background electrolyte is similar to or the same as that of stream 101. In the case where ferrous or ferrous/ferric iron is generated from leaching, the electrolyte may be acidic. When ferrous or ferrous/ferric salts or an electrolytic cell are used to generate ferrous or ferrous/ferric iron, the solution may be either acidic or alkaline.

Iron bearing stream 302 comprises selenium laden solids from a solid/liquid separation stage, Stage 3. As noted above, the retention time in the mixing tank is not a key variable in the overall process performance and, in certain embodiments, retention times as low as 3, 5 or 10 minutes may be employed, although typically retention times of between about 10 and about 90 minutes will be employed. Adjustment of the pH in the mixing tank by acid/base addition in Stage 1 may be required in order to maintain the pH within the working range of about pH7.0 to 13.0, for example between about pH8.0 and 12.0, or between about pH8.0 and 11.0.

Stream 102 exiting the mixing tank contains selenium captured by iron solids and reports to the solid/liquid separation stage, Stage 3. No acid/base addition is required at this stage. Floc may optionally be added in Stage 3 in order to enhance solid/liquid separation.

In order to exhaust the capacity of solids for selenium removal, a portion of the solids from Stage 3 may optionally be redirected back to the mixing tank in Stage 1 via stream 302. Stream 301 contains the final selenium bearing solids that may optionally be further treated for disposal. Stream 103 contains the treated solution with significantly lower selenium concentration, which can be adjusted according to the downstream/recirculation requirements.

Figure 5:
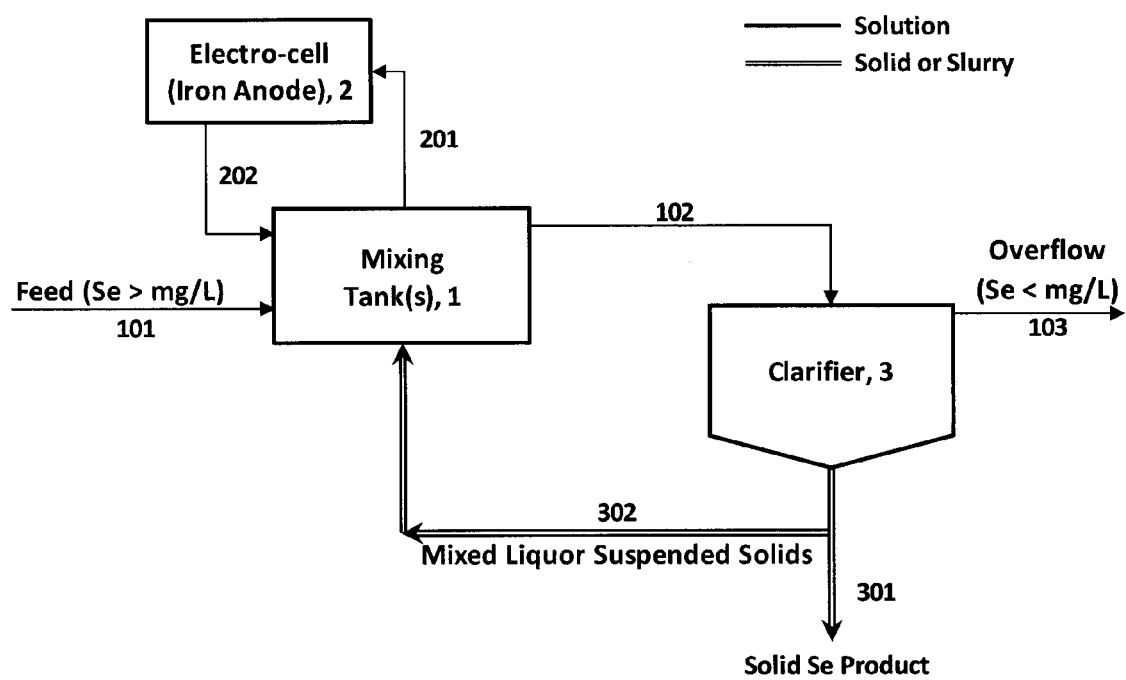
FIG. 5 presents a process for rapid bulk removal of selenate in accordance with one embodiment in which feed containing selenate flows through an electrolytic cell with an iron anode.

Another embodiment of the process is shown in FIG. 5. In this embodiment, an electrolytic cell is used in Stage 2 and not only provides a source of ferrous or ferrous/ferric iron, but also provides for reduction of a portion of selenate in the solution being treated to selenite and elemental selenium for which iron solids have a higher removal capacity. In the configuration shown in FIG. 5, the contents of the mixing tank are recirculated through the electrolytic cell as stream 201. In alternative embodiments, no recycling of the contents of the mixing tank is employed. The final solid selenium product produced in this embodiment of the process typically has a lower iron:selenium ratio than the product of the embodiment shown in FIG. 4. Using the electrolytic cell with iron anode at Stage 3 may also allow selenium removal to be achieved at lower iron additions due to the unique conditions inside the electrolytic cell. For example, areas inside the cell may exist that are highly concentrated in iron and selenium species and thus accommodate removal of selenium by solids at lower iron concentrations resulting in a better iron:selenium ratio in the final solid product.

Another embodiment of the process is shown in FIG. 6, illustrating integration of the process with other selenium removal treatments. In this embodiment, the process has been combined with an ion exchange (IX) treatment (Step 1) as an integrated circuit for selenium removal. The process utilizes an electrolytic cell (EC) with an iron anode as the source of ferrous or ferrous/ferric iron (Step 2), which receives spent regenerant 102 comprising high levels of selenium from the ion exchange (Step 1). In the embodiment shown in FIG. 6, selenium-iron solids 303 are recycled back from the clarifying step (Step 3) into the mixing chamber in order to exhaust the capacity of solids for selenium removal.

To gain a better understanding of the invention described herein, the following examples are set forth. It will be understood that these examples are intended to describe illustrative embodiments of the invention and are not intended to limit the scope of the invention in any way.

EXAMPLES

Example 1

Selenium Removal Through Ion-Exchange—Laboratory Scale

Figure 8:
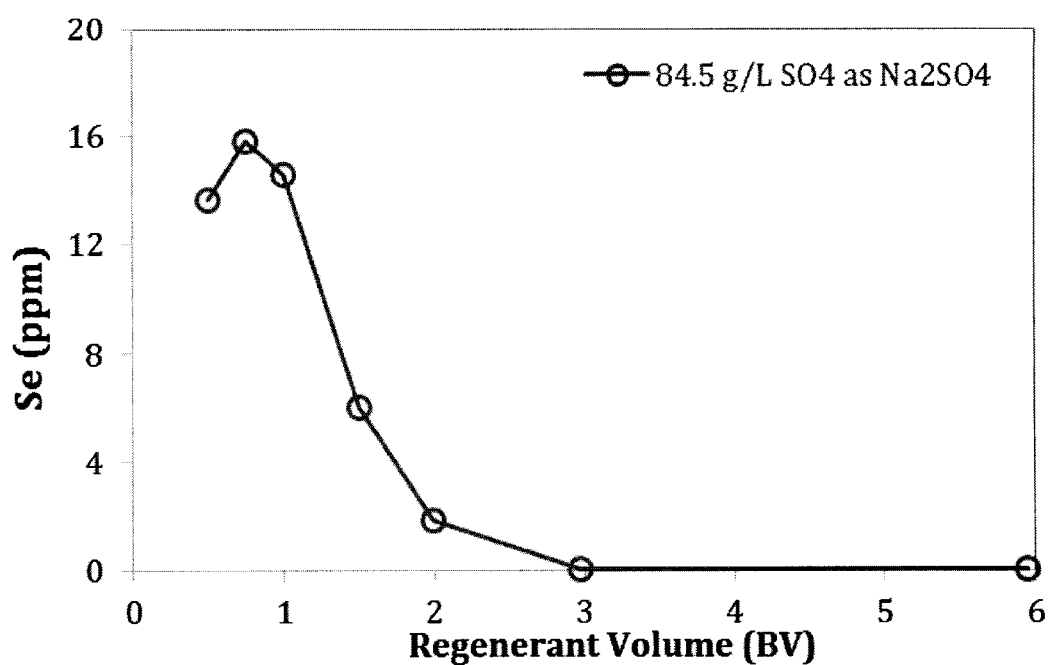
FIG. 8 is a graphic representation of the embodiment described in Example 1, showing Se concentration in spent regenerant as a function of regenerant volume. 1 BV=0.5 L, regeneration rate 1.5 BV/hr, fresh regenerant contains 84.5 g/L Na2SO4. The IX resin bed height is 3 ft, the IX column diameter is 1.5". Lanxess SBA resin M500.

Table 1 sets out the feed water chemistry of a water stream treated in accordance with one aspect of the invention, with resultant treatment parameters as set out in FIGS. 7 & 8.

TABLE 1

| Feed Water Chemistry Tested in Lab* | | | | |
|---|---|---|---|---|
| pH — | Conductivity mS/cm | Se µg/L | $SO_4$ mg/L | $NO_3$ as N mg/L |
| 7.64 | 1.43 | 363 | 735 | 93 |

*Feed water chemistry was tested in the lab using ion-exchange (IX) columns of minimum 2.5 cm diameter and 1.5 m tall.

Example 2

Selenium Removal Through Ion-Exchange—Pilot Plant Scale

Table 2 sets out the feed water chemistry of a water stream treated in the pilot plant in accordance with one aspect of the invention, with resultant treatment parameters as set out in FIGS. 9, 10 & 11.

TABLE 2

| Feed Water Chemistry Treated in the Pilot Plant | | | | |
|---|---|---|---|---|
| pH — | Conductivity mS/cm | Se µg/L | $SO_4$ mg/L | $NO_3$ as N mg/L |
| 7.8 | 1.43 | 457 | 2050 | 57 |

Example 3

Effect of pH on Bulk Selenium Removal

The effect of pH on selenate removal from a solution with >80 g/L TDS including sulphate, nitrate, carbonate and chloride. The test was performed using a configuration as shown in FIG. 4. A hydraulic retention time (HRT)=10 minutes at room temperature in a tank open to atmosphere was employed with recycle of selenium laden solids. Total iron concentration in the tank was set to 10 g/L, most of which was from recycle of selenium laden solids; 2 g/L ferrous addition came from an acidic ferrous sulphate source.

The results are shown in FIG. 12 and indicate that selenate removal was effective across a range of pH, with maximal removal occurring between about pH8.5 and pH8.8.

Example 4

Effect of Ferrous:Ferric Ratio on Selenium Removal

The effect of ferrous:ferric ratio in the mixing tank on selenium removal was investigated using the configuration shown in FIG. 4. Total iron added was 350 mg/L with total iron (including solids recycle) at 10 g/L; a pH of 8.5 was used and total dissolved solids (TDS) were >80 g/L. The initial selenium concentration was 4 mg/L and the HRT used was 10 minutes.

The results are shown in FIG. 13 and indicate that, under these conditions, selenate removal was effective across a range of ferrous:ferric ratios, with maximal removal occurring at ratios above 1:1.

Example 5

Continuous Selenate Removal Using an Electrolytic Cell

Table 3 sets out the results of continuous treatment of a selenate-bearing solution using an electrolytic cell (EC) with an iron anode at pH=9.0, HRT=10 minutes. The selenate-bearing solution was a spent ion-exchange (IX) regenerant containing 25 g/L $Na_2SO_4$ and 4.8 ppm selenate. The Fe:Se solids were recycled into the EC. The rate of this recycle was varied. The cell operating potential was 2 V. The anodic current density was 200 A/m2. The EC was operated using 2 L of solution and applied current was adjusted based on HRT to constantly generate 350 mg/L from the anode.

The Fe: Se solids recycled into the EC in this experiment included ferrous iron, ferric iron and selenium.

The results shown in Table 3 demonstrate the advantage of recycling solids and illustrate the low retention times that can be used effectively with this process.

TABLE 3

Continuous Treatment of a Selenate-Bearing Solution using an Electrolytic Cell

| Test Stage | Feed | Rate of Recycle g Fe/L EC feed | Start time (min) | End time (min) | HRT # | Feed Se (mg/L) | Discharge Se (mg/L) |
|---|---|---|---|---|---|---|---|
| 1-continuous | 25 g/L Na2SO4 + Se | 0 | 0 | 40 | 0 to 4 | 4.8 | 3.4 |
| 2-continuous | Same as 1 + recycle | 8 | 40 | 80 | 4 to 8 | 4.8 | 1.3 |
| 3-continuous | Same as 1 + recycle | 11.4 | 80 | 120 | 8 to 12 | 4.8 | 0.8 |
| 4-continuous | Same as 1 + recycle | 19.6 | 120 | 160 | 12 to 16 | 4.8 | 0.5 |

Example 6

Selenate Removal Using a Combination of Ion Exchange and an Electrolytic Cell

In a pilot plant using a combination of ion exchange and an electrolytic cell to remove selenium from contaminated water (as generally shown in FIG. 6), X-ray diffraction analysis of the final solid product (FIG. 14) confirmed the presence of magnetite and elemental selenium, the majority of which was in crystalline form (as indicated by the Lin (counts) value). The presence of these species makes the final solids more stable, particularly when they are present in crystalline form rather than an amorphous form.

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

We claim:

1. An ion exchange process for treating an aqueous solution to remove dissolved selenium oxyanions comprising:
    passing a primary aqueous solution comprising selenate and at least a second anion over a strongly basic anion exchange resin loaded with the second anion, under loading conditions whereby the selenate anions displace the second anion from the resin to produce a selenate-loaded resin and an ion exchange discharge solution comprising a lower concentration of selenate than the primary aqueous solution, wherein the second anion is present in the primary aqueous solution in excess of the selenate;
    treating the selenate-loaded resin with a regenerant solution comprising selenate and the second anion under regenerating conditions whereby the second anion in the regenerant solution displaces selenate anions from the selenate-loaded resin to produce a selenate-laden regenerant solution having a higher concentration of selenate than the primary aqueous solution, wherein the regenerant solution comprises a higher concentration of the second anion than the primary aqueous solution;
    removing selenate from the selenate-laden regenerant solution to produce a selenium-depleted regenerant solution, wherein the step of removing selenate anions from the selenate-laden regenerant solution comprises selenium removal in the presence of ferrous and/or ferric ion generated in an electrolytic cell; and
    recycling the selenium-depleted regenerant solution to form to the regenerant solution for treating the selenated-loaded resin.

2. The process according to claim 1, wherein the step of removing selenate anions from the selenate-laden regenerant solution further comprises selenium precipitation with ferrous and/or ferric iron, biological selenium removal, sorbent selenium removal, evaporation-crystallization selenium removal, or a combination thereof.

3. The process according to claim 1, wherein the electrolytic cell comprises an anode and cathode in a common electrolytic solution.

4. The process according to claim 3, wherein the electrolytic cell comprises an anode comprising iron, and the anode provides at least a part of the iron-bearing stream.

5. The process according to claim 4, wherein the cathode comprises: iron, stainless steel, or titanium.

6. The process according to claim 5, further comprising adding an acid or a base to the electrolytic cell to control pH therein.

7. The process according to claim 6, wherein the selenate concentration in the ion exchange discharge solution is about 10-fold lower than the selenate concentration in the primary aqueous solution.

8. The process according to claim 7, wherein the selenate concentration in the selenate-laden regenerant solution is about 2-fold higher than the selenate concentration in the primary aqueous solution.

9. The process according to claim 7, wherein the selenate concentration in the selenate-laden regenerant solution is about 10-fold higher than the selenate concentration in the primary aqueous solution.

10. The process according to claim 8, wherein the second anion is sulphate.

11. The process according to claim 10, wherein the primary aqueous solution comprises selenate anions in a concentration of less than about 1,000 ppb and sulphate anions in a concentration of greater than about 10,000 ppb; the ion exchange discharge solution has a selenate concentration less than about 100 ppb, and the selenate-laden regenerant solution has a selenate concentration greater than about 1,000 ppb.

12. The process according to claim 11, wherein the strongly basic anion exchange resin is a type 1 SBA.

13. The process according to claim 12, wherein the primary aqueous solution further comprises one or more of nitrates, carbonates, bicarbonates and chlorides.

14. The process according to claim 12, wherein the pH of the regenerant solution is between about pH 2 and pH10.

15. A process for treating an aqueous solution to remove dissolved selenium oxyanions comprising:
passing a primary aqueous solution comprising selenate and at least a second anion over a strongly basic anion exchange resin loaded with the second anion, under loading conditions whereby the selenate anions displace the second anion from the resin to produce a selenated-loaded resin and an ion exchange discharge solution comprising a lower concentration of selenate than the primary aqueous solution, wherein the second anion is present in the primary aqueous solution in excess of the selenate;
treating the selenated-loaded resin with a regenerant solution comprising selenate and the second anion under regenerating conditions whereby the second anion in the regenerant solution displaces selenate anions from the selenated-loaded resin to produce a selenate-laden regenerant solution having a higher concentration of selenate than the primary aqueous solution, wherein the regenerant solution comprises a higher concentration of the second anion than the primary aqueous solution;
passing the selenate-laden regenerant solution into an electrolytic cell;
contacting the selenate-laden regenerant solution in the electrolytic cell with one or more iron-bearing streams comprising ferrous iron or a ferrous/ferric iron mixture under conditions effective to co-precipitate or adsorb at least a portion of the selenate with the iron thereby producing a selenium-iron precipitate and a selenium-depleted discharge solution, the conditions comprising a retention time in the flow-through chamber of between about 5 minutes and about 90 minutes and a pH between about pH 7.0 and pH 13.0, wherein the one or more iron-bearing streams comprises a total iron content of 100 mg/L or greater;
separating the selenium-iron precipitate from the selenium-depleted discharge solution, and
recycling the selenium-depleted discharge solution to form the regenerant solution for treating the selenated-loaded resin.

16. The process according to claim 15, wherein the electrolytic cell comprises an anode and cathode in a common electrolytic solution.

17. The process according to claim 16, wherein the electrolytic cell comprises an anode comprising iron, and the anode provides at least a part of the iron-bearing stream.

18. The process according to claim 17, wherein the cathode comprises: iron, stainless steel, or titanium.

19. The process according to claim 18, further comprising adding an acid or a base to the electrolytic cell to control pH therein.

20. The process according to claim 19, further comprising recycling the selenium-iron precipitate into the flow-through chamber.

21. The process according to claim 20, further comprising subjecting the selenium-iron precipitate to one or more additional selenium removal steps to provide treated selenium-iron solids.

22. The process according to claim 21, further comprising recycling the treated selenium-iron solids into the flow-through chamber or to one of the additional selenium removal steps.

23. The process according to claim 22, wherein the selenate concentration in the ion exchange discharge solution is about 10-fold lower than the selenate concentration in the primary aqueous solution.

24. The process according to claim 23, wherein the selenate concentration in the selenate-laden regenerant solution is about 2-fold higher than the selenate concentration in the primary aqueous solution.

25. The process according to claim 23, wherein the selenate concentration in the selenate-laden regenerant solution is about 10-fold higher than the selenate concentration in the primary aqueous solution.

26. The process according to claim 24, wherein the second anion is sulphate.

27. The process according to claim 26, wherein the primary aqueous solution comprises selenate anions in a concentration of less than about 1,000 ppb and sulphate anions in a concentration of greater than about 10,000 ppb; the ion exchange discharge solution has a selenate concentration less than about 100 ppb, and the selenate-laden regenerant solution has a selenate concentration greater than about 1,000 ppb.

28. The process according to claim 27, wherein the step of contacting the selenate-laden regenerant solution in the electrolytic cell is for a time between about 10 minutes and about 90 minutes.

29. The process according to claim 28, wherein in the step of contacting the selenate-laden regenerant solution in the electrolytic cell, 50% or more of the selenate is removed from the selenate-laden regenerant solution.

30. The process according to claim 29, wherein the one or more iron-bearing streams comprise a ferrous/ferric iron mixture with a minimum ferrous:ferric ratio of 1:1.

31. The process according to claim 30, wherein the one or more iron-bearing streams comprise a ferrous/ferric iron mixture with a ferrous:ferric ratio of between about 1:1 and about 10:1.

32. The process according to claim 31, wherein the one or more iron-bearing streams have a total iron content of between about 100 mg/L and 50 g/L.

33. The process according to claim 32, wherein the one or more iron-bearing streams have a total iron content of between about 10 g/L and about 50 g/L.

34. The process according to claim 33, wherein the step of contacting the selenate-laden regenerant solution in the electrolytic cell is conducted at a pH between about pH 8.0 and pH 10.5.

35. The process according to claim 34, wherein the strongly basic anion exchange resin is a type 1 SBA.

36. The process according to claim 35, wherein the primary aqueous solution further comprises one or more of nitrates, carbonates, bicarbonates and chlorides.

37. The process according to claim 36, wherein the step of contacting the selenate-laden regenerant solution in the electrolytic cell further comprises adjusting the pH in the electrolytic cell such that that selenate is co-precipitated with mixed ferrous and ferric solids.

38. The process according to claim 37, wherein the pH of the regenerant solution is between about pH 2 and pH 10.

39. The process according to claim 30, wherein the one or more iron-bearing streams comprise a ferrous/ferric iron mixture with a ferrous:ferric ratio of between about 2:1 and 10:1.

* * * * *